United States Patent
Joo et al.

(10) Patent No.: US 12,017,961 B2
(45) Date of Patent: Jun. 25, 2024

(54) GRAPHENIC FIBERS, YARNS, COMPOSITES, AND METHODS OF MAKING THE SAME

(71) Applicant: Cornell University, Ithaca, NY (US)

(72) Inventors: Yong Lak Joo, Ithaca, NY (US); Ling Fei, Allen, TX (US); Seung Wan Kim, Santa Clara, CA (US)

(73) Assignee: Cornell University, Ithaca, NY (US)

( * ) Notice: Subject to any disclaimer, the term of this patent is extended or adjusted under 35 U.S.C. 154(b) by 988 days.

(21) Appl. No.: 16/614,263

(22) PCT Filed: May 16, 2018

(86) PCT No.: PCT/US2018/032970
§ 371 (c)(1),
(2) Date: Nov. 15, 2019

(87) PCT Pub. No.: WO2018/213446
PCT Pub. Date: Nov. 22, 2018

(65) Prior Publication Data
US 2020/0071233 A1 Mar. 5, 2020

Related U.S. Application Data

(60) Provisional application No. 62/506,956, filed on May 16, 2017.

(51) Int. Cl.
| | |
|---|---|
| *C04B 35/622* | (2006.01) |
| *C01B 32/16* | (2017.01) |
| *C04B 35/83* | (2006.01) |
| *D01D 5/00* | (2006.01) |

(52) U.S. Cl.
CPC ........ *C04B 35/62277* (2013.01); *C01B 32/16* (2017.08); *C04B 35/83* (2013.01); *D01D 5/0046* (2013.01); *C04B 2235/5248* (2013.01); *C04B 2235/526* (2013.01); *C04B 2235/5264* (2013.01); *C04B 2235/96* (2013.01)

(58) Field of Classification Search
CPC .............. C04B 35/62277; C04B 35/83; C04B 2235/5248; C04B 2235/526; C04B 2235/5264; C04B 2235/96; C04B 35/62272; C04B 35/80; C01B 32/16; C01B 32/184; D01D 5/0046; D01D 5/0076; D01F 1/02; D01F 9/14
See application file for complete search history.

(56) References Cited

U.S. PATENT DOCUMENTS

| | | | | |
|---|---|---|---|---|
| 2,160,962 A | * | 6/1939 | Formhals | D01D 5/0076 422/186.04 |
| 4,124,972 A | * | 11/1978 | Arai | D01H 1/115 57/328 |
| 2004/0041130 A1 | * | 3/2004 | Yamamoto | H01M 4/587 252/500 |
| 2008/0208323 A1 | * | 8/2008 | El-Kurdi | A61L 27/3625 623/1.36 |
| 2010/0317790 A1 | | 12/2010 | Jang et al. | |
| 2014/0308517 A1 | | 10/2014 | Zhamu et al. | |
| 2016/0248100 A1 | * | 8/2016 | Joo | H01M 4/8882 |
| 2017/0015064 A1 | * | 1/2017 | Potter | B33Y 10/00 |
| 2018/0186666 A1 | * | 7/2018 | Gardiner | B01D 61/46 |
| 2019/0040550 A1 | * | 2/2019 | Han | D01D 1/02 |
| 2019/0048161 A1 | * | 2/2019 | Zeng | C01B 32/182 |
| 2019/0048491 A1 | * | 2/2019 | Bai | D01D 1/04 |

FOREIGN PATENT DOCUMENTS

| | | |
|---|---|---|
| CN | 103848415 A | 6/2014 |
| JP | S53086847 A | 7/1978 |
| JP | S53090433 A | 8/1978 |
| JP | 2004143652 A | 5/2004 |
| JP | 2016190982 A | 11/2016 |
| WO | 2015/084945 A1 | 6/2015 |

OTHER PUBLICATIONS

Dong, Z., et al., Facile Fabrication of Light, Flexible and Multi-functional Graphene Fibers, Advanced Materials, 2012, pp. 1-6. https://pdfs.semanticscholar.org/c414/275733c4d607f653250139a0ea8c845e4acf.pdf.

Foroughi, et al., "Effect of Post-Spinning on the Electrical and Electrochemical Properties of Wet Spun Graphene Fibre," RSC Advances, vol. 6, No. 52, Jan. 1, 2016, all enclosed pages cited.

Matsumoto, et al., "Electrospun Composite Nanofiber Yarns Containing Oriented Graphene Nanoribbons," ACS Applied Materials & Interfaces, vol. 5, No. 13, Jul. 10, 2013, all enclosed pages cited.

* cited by examiner

*Primary Examiner* — Muhammad S Siddiquee
(74) *Attorney, Agent, or Firm* — Hodgson Russ LLP

(57) ABSTRACT

Provided in certain embodiments are high performance graphene fibers and yarns, including components and precursors thereof, and composites comprising the same. Also provided herein are methods of manufacturing such fibers, yarns, composites, and components/precursors thereof.

7 Claims, 9 Drawing Sheets

GRAPHENIC FIBERS, YARNS, COMPOSITES, AND METHODS OF MAKING THE SAME

CROSS REFERENCE TO RELATED APPLICATIONS

This application claims priority to U.S. Provisional Application No. 62/506,956, filed on May 16, 2017, the disclosure of which is hereby incorporated by reference.

BACKGROUND OF THE INVENTION

The demand for carbon fibers has been increasing steadily, and is expected to reach 89,000 ton by 2020. The largest application for carbon fibers is the aerospace and defense industry, which takes up 30% of global demand and 50% of global revenues in carbon fibers. Carbon fibers are generally produced by stabilizing polymer (PAN) fibers at a temperature less than 400° C., carbonizing the polymer (PAN) fibers at about 1500° C., and optional graphitization of the fibers at a temperature up to 3000° C.

Carbon fibers can exhibit up to six times the specific strength and 67% greater relative stiffness than steel. Specifically, in typical carbon fibers, the tensile strength of the fiber is very high, at about 2-7 GPa. The density/mass of the carbon fibers is quite high, with a typically have a high density of about 1.8-2 g/cc. This density/mass makes carbon fibers very heavy in some applications. For example, in aerospace and automotive applications, increased density leads to an increase in payload, which requires additional power for propulsion. In addition, the failure strain of carbon fibers is low, with typical values of less than 2%, making them unsuitable for many applications.

SUMMARY OF THE INVENTION

In some instances, graphenic (e.g., graphene) fibers are produced having much lower densities and less brittle (higher failure strain) than those observed for carbon fibers. In certain instances, graphenic (e.g., graphene) fibers have a density of about 1.8 g/cc or less, about 1.5 g/cc or less, or about 1 g/cc or less. With a high enough strength and a low enough density, the strength/weight ratio of graphenic fibers provide an exciting replacement for carbon fibers, particularly in instances wherein overall mass of the payload is an important consideration, such as in the aerospace and automobile industries.

Some preliminary attempts to manufacture graphene fibers produced fibers with low densities, but also with low tensile strengths (e.g., 0.1-0.5 GPa), relative to carbon fibers (e.g., 2-7 GPa), providing little overall benefit in those applications where high strength and low mass is desired because in order to achieve a comparable strength benefit as carbon fiber, more volume and a comparable mass of graphene fiber would be required.

Provided herein, are graphenic yarns comprising a number (plurality) of bundled graphenic filaments (fibers). In certain instances, such graphene fibers and/or yarns have very good tensile strength (e.g., greater than 0.5 GPa, such as >1 GPa, >1.5 GPa, about 2-3 GPa, or the like), with low densities (e.g., about 1.5 g/cc or less, about 1.2 g/cc or less, about 0.2 g/cc to about 1.2 g/cc, about 0.5 g/cc to about 1 g/cc or the like). Such strengths and densities provide very good strength to mass ratios relative to carbon fibers and early attempts at graphene fibers. Also provided herein are methods of manufacturing such yarns, individual filaments (fibers), as well as precursors of such filaments and yarns.

In specific embodiments, provided herein is a graphenic yarn comprising a plurality of bundled fibers, the plurality of bundled fibers comprising at least one graphenic fiber comprising one or more graphenic components, the graphenic fiber having an average thickness, the one or more of graphenic components having an average length and an average width, the average length being greater than the average width, and the average length and width of the one or more of graphenic components being greater than the average graphenic fiber thickness. In some embodiments, yarns provided herein have low density and high strength, such as described herein. In certain embodiments, yarns provided herein have a tenacity of about 20 g/d (gram-force/denier) or more. In further or alternative embodiments, such yarns are less brittle than carbon fibers, such as having a failure strain of about 4% or more (e.g., about 5% or more).

Also, provided in certain embodiments herein are graphenic fibers (or filaments), such fibers being independent and/or a part of a yarn provided herein. In certain embodiments, provided herein is a graphenic fiber comprising a one or more graphenic components. In some embodiments, graphenic fibers (e.g., nanofibers) provided herein comprise a continuous graphenic component, such as a graphenic component that runs continuously from one end of the graphenic fiber to another, or along a substantial length thereof, such as at least 25% of the length of the fiber, at least 50% the length of the fiber, at least 75% the length of the fiber, at least 90% the length of the fiber, or the like. In certain embodiments, the graphenic fiber has an average thickness, the one or more graphenic components have an average length and an average width, the average length being greater than the average width, and the average length and width of the one or more graphenic components being greater than the average graphenic fiber thickness or diameter.

In certain embodiments, the graphenic fibers comprise a high content of carbon (e.g., at least 50 wt. %, at least 70 wt. %, at least 80 wt. %, at least 90 wt. %, at least 95 wt. % or the like). In some embodiments, the graphenic fibers comprise a high content of one of more graphenic component (e.g., at least 50 wt. %, at least 70 wt. %, at least 80 wt. %, at least 90 wt. %, at least 95 wt. % or the like). In certain embodiments, the one or more graphenic component comprises graphene (e.g., pristine or low defect graphene), reduced graphene oxide, graphene oxide, or any combination thereof. In certain embodiments, the fiber comprises one or more graphenic component that (collectively) form a continuous morphology within the fiber (e.g., along at least 50% the length of the fiber). In more specific embodiments (e.g., wherein the one or more graphene oxide components have been thermally treated to form a high aspect ratio graphene (e.g., pristine or relative low defect graphene (e.g., having a defect density of less than 2%))) the fiber comprises one or more continuous graphene within the fiber (e.g., along at least 50% the length of the fiber). In some embodiments, fibers provided herein have low density and high strength, such as described herein. In certain embodiments, yarns provided herein have a tenacity of about 20 g/d (gram-force/denier) or more. In further or alternative embodiments, such yarns are less brittle than carbon fibers, such as having a failure strain of about 4% or more (e.g., about 5% or more).

In certain embodiments, a graphenic component provided herein, such as of a stock or fiber herein, has a lateral dimension (e.g., longest dimension) of at least 10 micron, at least 15 micron, or, more preferably, at least 20 micron. In some instances, use of smaller lateral dimensional graphenic materials leads to the poor formation of fibers and/or brittle or weak graphenic fibers. In certain instances, use of larger lateral dimension graphenic fibers facilitates fusion of the graphenic components to one another during thermal treatment, which in turn facilitates the formation of graphenic fibers having very good strength across and/or along the fiber.

In some embodiments, a graphenic component provided herein, such as of a stock or fiber herein, is a multi-layered graphenic component, such as comprising at least 2 graphenic layers. In preferred embodiments, the multi-layered graphenic component comprises 2 to 15 graphenic layers. In more preferred embodiments, the multi-layered graphenic component comprises 3 to 10 graphenic layers. In some instances, a couple to a few graphenic layers provides structural stability to and/or facilitates improved alignment of the graphenic structuring when forming or formed into a fiber, such as to facilitate good fusing of the graphenic components during post-process treatment (e.g., during thermal fusing treatment). In certain instances, as the components comprise more and more layers and become more graphitic in nature, graphenic structures are no longer formed in the fiber during post-processing treatment, and can result in decreased performance parameters.

In some provided herein, the graphenic fibers are composite (including hybrid morphologies) fibers comprising one or more graphenic component and a secondary material (e.g., a matrix and/or continuous material), such as polymer and/or carbon (e.g., amorphous and/or graphitic). In certain embodiments, polymer/graphenic fibers comprise polymer and graphene oxide. In specific embodiments, such fibers are useful as precursors to highly graphenic fibers and/or graphenic/carbon fibers.

Provided in some embodiments herein is a process for manufacturing a graphenic fiber or yarn, the process comprising:
  a. electrospinning a stock into a fluid medium (e.g., into an air flow and/or a coagulation bath), the stock comprising a graphenic component and a liquid medium (e.g., water) to produce a fiber (e.g., comprising a plurality of non-fused graphenic components); and
  b. thermally treating the fiber, such as to fuse the non-fused graphenic components thereof into one or more (e.g., a plurality of) continuous graphenic component(s).

In some embodiments, the fluid medium is a liquid medium, such as a coagulation bath (e.g., wherein the process is known as "wet spinning"). In certain embodiments, the liquid medium is an aqueous medium. In some embodiments, the liquid medium (e.g., aqueous medium) comprises a surfactant or salt. In specific embodiments, the surfactant is an ionic (e.g., cationic) surfactant. In specific embodiments, the ionic surfactant comprises a hydrocarbon group, such as a fatty alkyl (e.g., an alkyl comprising from 6-26 carbons, 10-26 carbons, 14-22 carbons, or the like). In some embodiments, the ionic surfactant comprises a carboxylate, a sulphonate, a sulphate, a quaternary ammonium, or a phosphate. In specific embodiments, the ionic surfactant comprises a quaternary ammonium group. In some embodiments, exemplary surfactants comprising a fatty alkyl group and a quaternary ammonium include, by way of non-limiting example, hexadecyltrimethylammonium bromide (CTAB), dodecyltrimethylammonium bromide (DTAB), distearyldimethylammonium chloride, and diethyl ester dimethyl ammonium chloride.

In certain embodiments, the liquid medium is heated, such as to a temperature of about 30° C. or more. In specific embodiments, the liquid medium has a temperature of about 40° C. or more, such as about 30° C. to about 60° C. In more specific embodiments, the liquid medium has a temperature of about 40° C. to about 55° C. In certain instances, elevated temperature of the liquid medium facilitates good formation of individual fibers or yarns, with better packing and better handling characteristics. In some instances, if the fibers are not packed well enough, fibers, such as when collected on a roll, can deform to form a flatter, ribbon-like structure which can stick to or combine with adjacent materials, such as other similarly structured fibers.

Provided in some embodiments herein is a process for manufacturing a graphenic fiber or yarn, the process comprising injecting a fluid stock with or into one or more gas stream. In certain embodiments, the process comprises electrostatically charging the fluid stock and injecting the electrostatically charged fluid stock into and/or with the one or more gas stream (e.g., an electrospinning processes). In some embodiments, provided herein is a process of gas-assisted spinning (e.g., electrospinning) of a fluid stock to produce one or more fiber (e.g., filament). In certain embodiments, the fluid medium is a high velocity gas, such as having a velocity of at least 0.1 m/s, at least 0.5 m/s, at least 5 m/s, or the like.

In some embodiments, a process herein further comprises bundling of one or more fiber produced by a gas-assisted process described herein to form a graphenic yarn.

In certain embodiments, a process herein comprises drawing the fiber and/or bundle thereof (e.g., so as to align the graphenic components of the fiber(s)). In some embodiments, the process comprises twisting the fibers and/or bundles, such as to produce a twisted yarn. In some embodiments, the process comprises winding bundled fibers (a yarn), such as onto a spool.

In some embodiments, the fluid stock comprises a graphenic component, such as an oxidized graphene (e.g., graphene oxide) and a liquid medium. Any suitable concentration of graphenic component is optionally utilized. In certain embodiments, the fluid stock further comprises a polymer (e.g., to facilitate fiber formation). In some embodiments, use of a graphene component results in a fluid stock having a high viscosity (moreso when a polymer component is also included in the stock), particularly when such component(s) are included in high concentrations, such as to allow the production of high quality and highly uniform products. In some instances, the concentration of graphenic component in the stock is greater than 0.5 wt. %, such as about 1 wt. % or more. In more preferred embodiments, the concentration of graphenic component in the stock is about 1.5 wt. % or more, such as about 2 wt. %. In certain embodiments, manufacturing techniques provided herein allow for the processing of such high viscosity stocks. Moreover, in some instances, techniques provided herein allow for the formation of fine filaments (fibers), which minimize the core/shell effects of the material and allow for the production of high performance fiber materials, which can then be bundled to produce bundled materials (yarns), such as described herein. In some preferred embodiments, a polymer is included in the stock, e.g., to facilitate the formation of fine fibers (e.g., which are then bundled), which can then be bundled, rather than simply coagulating graphenic components into large diameter materials having poor performance characteristics and/or strong shell/core effects.

More detailed and further embodiments are discussed in the detailed description of the invention herein. These and other objects, features, and characteristics of the system and/or process disclosed herein, as well as the processes of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, unless otherwise stated, values and characteristics described for individual components herein also include disclosure of such values and characteristics as an average of a plurality (i.e., more than one) of such components. Similarly, disclosure of average values and characteristics herein also includes a disclosure of an individual value and characteristic as applied to a single component herein.

In certain instances, a value "about" an indicated value is a value suitable for achieving a suitable result and/or a result similar as achieved using the identified value. In some instances, a value "about" an indicated value is between ½ and 2 times the indicated value. In certain instances, a value "about" an indicated value is ±50% the indicated value, ±25% the indicated value, ±20% the indicated value, ±10% the indicated value, ±5% the indicated value, ±3% the indicated value, or the like.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
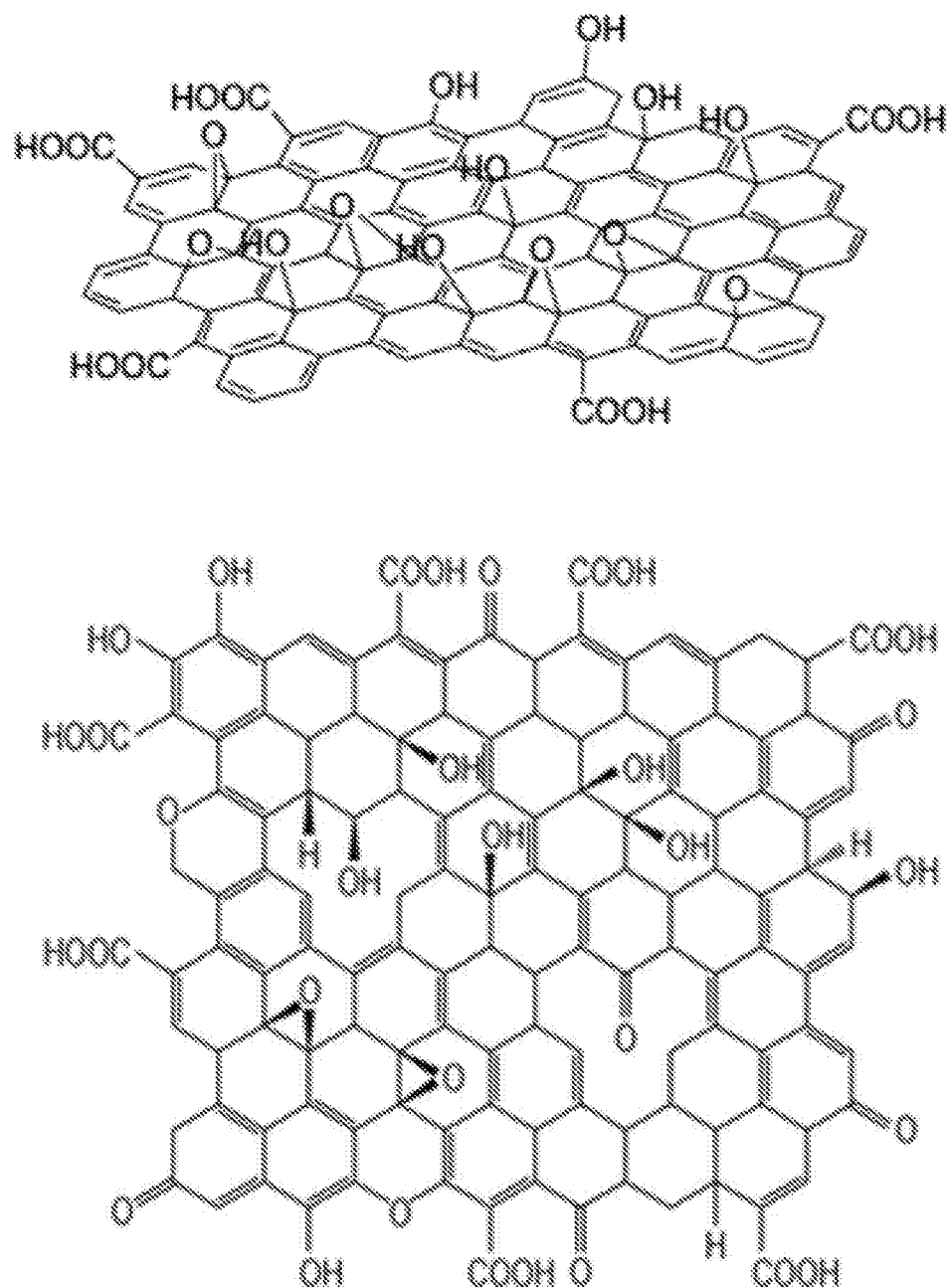
FIG. 1 illustrates an exemplary structure of a graphene oxide, including various exemplary functional modifications of a graphene structure in a graphene oxide.

Provided in certain embodiments herein are graphenic yarns, graphenic fibers, precursors thereof, precursor compositions thereof, processes of manufacturing any such materials, and the like, which are described in more detail herein.

In certain embodiments, provided herein are graphenic yarns and graphenic fibers. In specific embodiments, a graphenic yarn comprises a plurality (i.e., more than one) of bundled fibers, the plurality of bundled fibers comprising at least one graphenic fiber. In certain embodiments, graphenic fibers provided herein comprise one or more graphenic component(s). In some instances, graphenic components of (e.g., pre-fusing) graphenic fibers provided herein comprise a plurality of large lateral dimension (e.g., and an aspect ratio (length/width) of less than about 10) graphenic components (e.g., graphene oxide, reduced graphene oxide, or graphene). In certain instances, (post-fusing) graphenic fibers provided herein comprise one or more graphenic component (graphene), such as wherein the graphenic component has a large aspect ratio (length/width of at least 10, at least 50, at least 100, or the like) and/or is largely continuous along the length of the fiber.

In preferred embodiments, the one or more of graphenic components (e.g., pre-fusing and/or post-fusing) having an average length and an average width, the average length being greater than the average width, and the average length and width of the one or more of graphenic components (both) being greater than the average graphenic fiber thickness or diameter. In some embodiments, the fiber (filament) has a belt-like or a cylindrical structure. In certain embodiments wherein the graphenic component has a width greater than the average diameter of the fiber, the graphenic components are folded or rolled within the fiber construct. In some instances, such a configuration facilitates good lateral flexibility and/or good longitudinal strength.

In certain embodiments, a graphenic component provided herein (e.g., of a pre-fused graphenic fiber) has a lateral dimension (e.g., length or longest dimension) of at least 10 micron, at least 15 micron, or, more preferably, at least 20 micron. In some embodiments, the graphenic component provided herein (e.g., of a post-fused graphenic fiber) has a lateral dimension (e.g., length or longest dimension) of at least 100 micron, at least 200 micron, or at least 500 micron. In certain instances, pre-fused and post-fused graphenic components have similar or different widths (e.g., in some instances, some graphenic fusing may or may not occur along the width of the graphenic components). In some embodiments, graphenic components provided herein have a width of about 5 micron or more, about 10 micron or more, about 15 micron or more, about 20 micron or more, or the like.

In some embodiments, a graphenic component provided herein, such as of a stock or fiber herein, is a multi-layered graphenic component, such as comprising at least 2 graphenic layers. In preferred embodiments, the multi-layered graphenic component comprises 2 to 15 graphenic layers. In more preferred embodiments, the multi-layered graphenic component comprises 3 to 10 graphenic layers.

While yarns provided herein include any yarn comprising a fiber herein, in preferred embodiments, the yarn comprises a plurality of graphenic fibers. In specific embodiments, at least 20% of the fibers (filaments) within the yarn are graphenic (e.g., by number). In more specific embodiments, at least 40% of the fibers (filaments) within the yarn are graphenic. In still more specific embodiments, at least 60% of the fibers (filaments) within the yarn are graphenic. In yet more specific embodiments, at least 80% of the fibers (filaments) within the yarn are graphenic. In more specific embodiments, at least 90% (e.g., at least 95%, at least 98%, or the like) of the fibers (filaments) within the yarn are graphenic.

In certain embodiments, high concentrations of graphenic component (e.g., graphene) are included in the yarns herein, such as to take advantage of the advantageous characteristics of graphene, including high strength, decreased brittleness over carbon fibers, and the like. In some embodiments, however, other materials (e.g., non-graphenic carbon, polymer, etc.) are included in the graphenic fibers and/or yarns provided herein. Such materials may be included to modify characteristics of the fibers and/or yarns, to reduced manufacturing costs, and/or as a material provided in a precursor provided herein.

In some embodiments, at least 10 wt. % of the yarn is graphenic fiber(s). In specific embodiments, at least 20 wt. % of the yarn is graphenic fiber(s). In more specific embodiments, at least 40 wt. % of the yarn is graphenic fiber(s). In yet more specific embodiments, at least 60 wt. % of the yarn is graphenic fiber(s). In more specific embodiments, at least 80 wt. % of the yarn is graphenic fiber(s). In still more specific embodiments, at least 90 wt. % (e.g., at least 95 wt. %, at least 98 wt. %, or the like) of the yarn is graphenic fiber(s). In some embodiments, at least 10 wt. % of the yarn is graphenic component(s). In specific embodiments, at least 20 wt. % of the yarn is graphenic component(s). In more specific embodiments, at least 40 wt. % of the yarn is graphenic component(s). In yet more specific embodiments, at least 60 wt. % of the yarn is graphenic component(s). In more specific embodiments, at least 80 wt. % of the yarn is graphenic component(s). In still more specific embodiments, at least 90 wt. % (e.g., at least 95 wt. %, at least 98 wt. %, or the like) of the yarn is graphenic component(s).

In certain embodiments, yarns provided herein comprises graphenic component(s) and an optional non-graphenic carbon component (e.g., amorphous and/or graphitic carbon). In specific embodiments, the yarn comprises graphenic component(s) and a non-graphenic carbon component. In preferred embodiments, the graphenic component constitutes a greater percentage of the yarn and/or fiber than does a non-graphenic carbon component. For example, in certain embodiments, a graphenic yarn or fiber provided herein comprises less than 50 wt. % graphitic and amorphous carbon, when taken together. In specific embodiments, a graphenic yarn or fiber provided herein comprises less than 40 wt. % graphitic and amorphous carbon, when taken together. In more specific embodiments, a graphenic yarn or fiber provided herein comprises less than 20 wt. % graphitic and amorphous carbon, when taken together. In still more specific embodiments, a graphenic yarn or fiber provided herein comprises less than 10 wt. % graphitic and amorphous carbon, when taken together. In certain embodiments, yarns provided herein have higher graphenic component, such as to preserve the good performance characteristics of graphenes, without unnecessarily increasing the mass and/or density thereof.

In certain embodiments, the carbon content (e.g., on an elemental basis) of a yarn or fiber herein varies depending on whether the yarn or fiber is a composite or a highly graphenic yarn/fiber. For example, in some instances the carbon content of a yarn/fiber is lower for a graphenic/polymer composite yarn fiber than the same yarn/fiber post-pyrolysis or post-washing (e.g., whereby the polymer is removed with solvent). In certain embodiments, the carbon content is at least 10 wt. % of a yarn and/or fiber provided herein. In specific embodiments, the carbon content is at least 20 wt. % of a yarn and/or fiber provided herein. In more specific embodiments, the carbon content is at least 40 wt. % of a yarn and/or fiber provided herein. In still more specific embodiments, the carbon content is at least 60 wt. % of a yarn and/or fiber provided herein. In yet more specific embodiments, the carbon content is at least 80 wt. % of a yarn and/or fiber provided herein. In preferred embodiments, the carbon content is at least 90 wt. % of a yarn and/or fiber provided herein. In more preferred embodiments, the carbon content is at least 95 wt. % of a yarn and/or fiber provided herein. In some instances, high carbon content yarns provided herein are used as reinforcing materials in a bulk matrix material, such as a resin, polymer, metal, or the like.

In certain embodiments, the graphenic component of yarns and fibers provided herein is an oxidized graphene, such as graphene oxide. In certain embodiments, yarns or fibers provided herein comprise a high degree of oxygen and carbon. In some embodiments, the carbon and oxygen content, collectively, is at least 40 wt. % of a yarn and/or fiber provided herein. In specific embodiments, the carbon and oxygen content, collectively, is at least 60 wt. % of a yarn and/or fiber provided herein. In yet more specific embodiments, the carbon and oxygen content, collectively, is at least 80 wt. % of a yarn and/or fiber provided herein. In preferred embodiments, the carbon and oxygen content, collectively, is at least 90 wt. % of a yarn and/or fiber provided herein. In more preferred embodiments, the carbon and oxygen content, collectively, is at least 95 wt. % of a yarn and/or fiber provided herein.

In some embodiments, yarns or fibers provided herein comprise a graphenic component (e.g., an oxidized graphene, such as graphene oxide) and a polymer. In certain embodiments, such composite yarns or fibers are further processed to form graphenic/carbon composite yarns/fibers, graphene yarns/fibers, or are used in material applications themselves. In certain embodiments, a graphenic yarn and/or fiber provided herein is less than 90 wt. % polymer. In specific embodiments, the yarn and/or fiber is less than 80 wt. % polymer. In more specific embodiments, the yarn and/or fiber is less than 60 wt. % polymer. In still more specific embodiments, the yarn and/or fiber is less than 40 wt. % polymer. In more specific embodiments, the yarn and/or fiber is less than 20 wt. % polymer. In still more specific embodiments, the yarn and/or fiber is less than 10 wt. % (e.g., less than 5 wt. %, less than 2 wt. %, or the like) polymer.

In various embodiments, any suitable polymer is used in a yarn, fiber, filament, stock, process, etc. described herein. In specific embodiments, the polymer is polyvinyl alcohol (PVA), polyethylene oxide (PEO), polyacrylonitrile (PAN), nylon, polyvinylidene difluoride (PVDF), polyvinylpyrrolidone (PVP), or any combination of one or more of such polymers.

In certain embodiments, the yarns or fibers provided herein have good strength with relatively low density. In some embodiments, the strength of the yarns or fibers herein is comparable to the strength of carbon fibers, while having a lower density (e.g., wherein the strength/density is greater than the strength/density of typical carbon fibers).

In some embodiments, a yarn or fiber provided herein has a density of less than 2 g/cc (cubic cm). In specific embodiments, the yarn or fiber has a density of less than 1.9 g/cm$^3$. In more specific embodiments, the yarn or fiber has a density of less than 1.5 g/cm$^3$. In more specific embodiments, the yarn or fiber has a density of less than 1 g/cm$^3$. In still more specific embodiments, the yarn or fiber has a density of less than 0.8 g/cm$^3$. In yet more specific embodiments, the yarn or fiber has a density of less than 0.6 g/cm$^3$. In more specific embodiments, the yarn or fiber has a density of less than 0.4 g/cm$^3$. In some embodiments, the yarn or fiber has a density of at least about 0.1 g/cm$^3$. In specific embodiments, the yarn or fiber has a density of at least about 0.2 g/cm$^3$.

In various embodiments, yarns and fibers provided herein have any suitable diameter. In some embodiments, yarns herein have a diameter comparable to the diameter of a commercial carbon fiber. In some instances, the diameter of a yarn provided herein is tailored to a specific application, such as to match the diameter of a carbon fiber used in a similar application, but such size matching is not necessary. In various embodiments, processes provided herein provide a great deal of control over filament and yarn sizes, such that bundling techniques are modified in various embodiments in order to tune the size of the yarns provided herein, as desired. In various embodiments, large or small yarns and/or fibers, such as up to hundreds of microns down to fractions of microns are optionally provided. In specific embodiments, a yarn or fiber provided herein has an average diameter of about 100 micron (micrometer) or less. In more specific embodiments, a yarn or fiber provided herein has an average diameter of about 50 micron or less. In more specific embodiments, a yarn or fiber provided herein has an average diameter of about 25 micron or less. In certain embodiments, a yarn or fiber provided herein has an average diameter of about 0.2 micron or more. In specific embodiments, a yarn or fiber provided herein has an average diameter of about 0.5 micron or more. In more specific embodiments, a yarn or fiber provided herein has an average diameter of about 1 micron or more. In some embodiments, a yarn or fiber provided herein has an average diameter of about 5 micron to about 20 micron. In alternative embodiments, a yarn or fiber provided herein has an average diameter of about 1 micron to about 10 micron. In certain instances, a yarn is provided herein and comprises a plurality of fibers, such that the diameter of the fibers are necessarily smaller than that of the yarn. In certain instances, graphenic nanofibers (e.g., having a diameter of less than 5 micron, less than 2 micron, or the like) are produced by any suitable process, such as a process described herein, wherein a stock is electrospun with a gas stream (e.g., gas-assisted electrospinning). In some instances, larger graphenic nanofibers (e.g., having a diameter of at least 2 micron, at least 5 micron, at least 10 micron, about 10 micron to about 50 micron, or the like) are prepared by any suitable process, such as by a process described herein wherein a stock is electrospun into a liquid medium (e.g., wet spinning).

In various embodiments, yarns provided herein comprise a simple aligned bundle of fibers (filaments). In some embodiments, yarns provided herein comprise a bundle of twisted fibers (filaments). In specific embodiments, yarns provided herein comprise a plurality of bundled fibers (which may be themselves twisted or non-twisted), such bundles of fibers being twisted to form a larger bundle of fibers. In some instances, bundling of the fibers provided herein to provide a yarn described herein reduces shell/core effects in the overall material and/or provide improved performance characteristics (e.g., strength, particularly strength relative to density or mass) relative to similarly sized fibers (e.g., large graphenic fibers and/or carbon fibers of a size similar diameter).

In certain embodiments, yarns and fibers have good performance characteristics, such as low brittleness and high strength (particularly, relative to mass and/or density, such as a density described herein). In certain embodiments, provided herein are yarns or fibers having a tensile strength of at least 1 GPa. In specific embodiments, yarns or fibers provided herein have a tensile strength of about 1.5 GPa or more. In more specific embodiments, yarns or fibers provided herein have a tensile strength of about 2 GPa or more. In still more specific embodiments, yarns or fibers provided herein have a tensile strength of about 2.5 GPa or more. In yet more specific embodiments, yarns or fibers provided herein have a tensile strength of about 3 GPa or more. In some embodiments, yarns or fibers provided herein have a tensile strength of about 2 GPa to about 3 GPa.

In some embodiments, provided herein is a yarn or fiber having a tenacity of about 10 g/d (gram-force/denier) or more. In specific embodiments, provided herein is a yarn or fiber having a tenacity of about 15 g/d or more. In preferred embodiments, provided herein is a yarn or fiber having a tenacity of about 20 g/d or more. In more preferred embodiments, provided herein is a yarn or fiber having a tenacity of about 22.5 or more. In certain embodiments, yarns or fibers having high graphenic content (e.g., and lower non-graphenic carbon content, lower polymer content, etc.) have an even greater tenacity. In some embodiments, yarns or fibers provided herein have a tenacity of about 25 g/d or more. In more specific embodiments, yarns or fibers provided herein have a tenacity of about 30 g/d or more.

Figure 2:
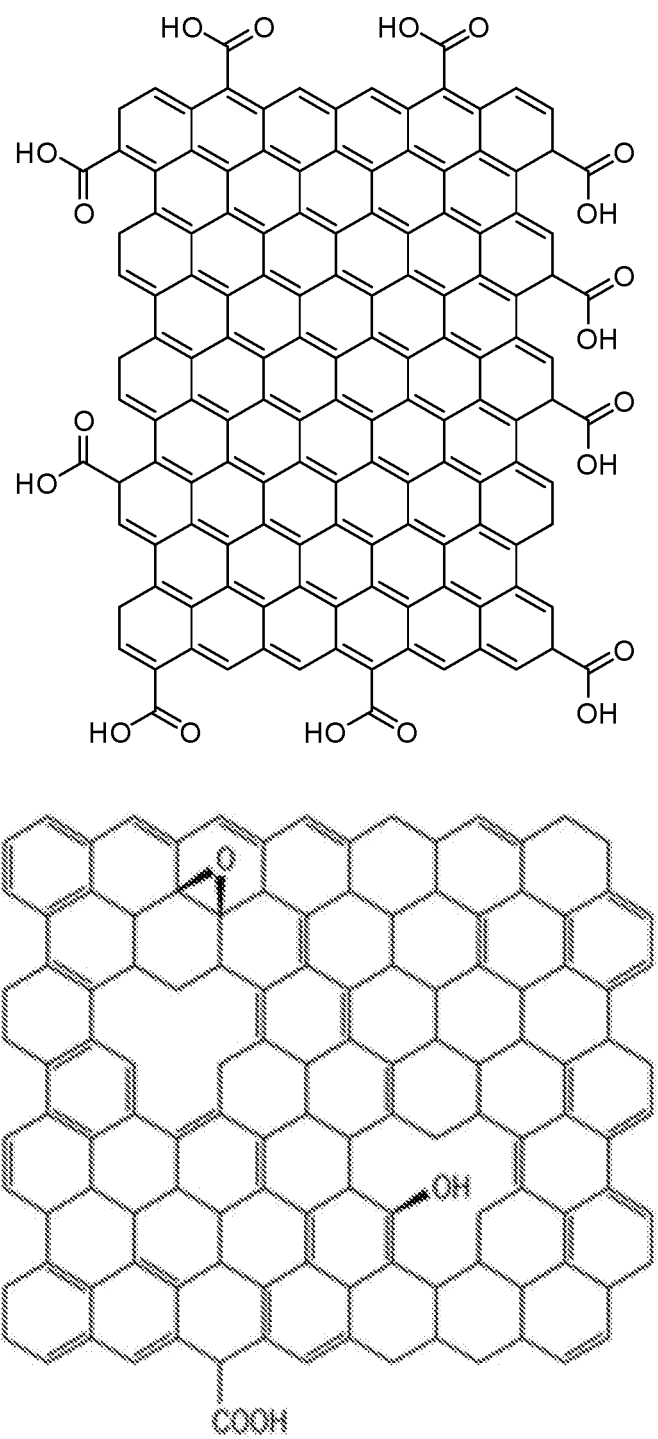
FIG. 2 illustrates an exemplary structure of a reduced graphene oxide, including various exemplary functional modifications of a graphene structure in a reduced graphene oxide, or a non-pristine graphene.

In certain embodiments, yarns provided herein comprise one or more graphenic fiber, such as described herein. In general, graphenic fibers provided herein comprise one or more graphenic component. In various embodiments, the graphenic components are graphene (e.g., pristine or low defect), reduced graphene oxide, graphene oxide (or other oxidized graphenic compound), or the like. In certain embodiments, low defect graphene has fewer than 3% defects (e.g., on a point by point basis—i.e., how many "points" in the graphene honeycomb lattice differ from the perfect honeycomb lattice of pristine graphene). In some embodiments, low defect graphene has fewer than 2% defects. In specific embodiments, low defect graphene has fewer than 1% defects. In specific embodiments, low defect graphene has fewer than 0.5% defects. In various instances, defects include functionalization of a graphene, such as with a hydrogen, halide, hydrocarbon (e.g., alkyl groups, alkyl bridges, or the like), oxygen containing group (e.g., carboxylate, hydroxyl, carbonyl, ketone, ether, etc.), nitrogen containing group (e.g., amino, including alkylamino), sulfur, or the like, and/or other defects in the lattice structure of graphene, such as open rings from missing carbons, and the like. For example, the bottom reduce graphene oxide of FIG. 2 illustrates a number of defects, including missing carbon, resulting in open rings, addition of hydrogen (e.g., resulting in loss of C=C double bonds), and additions of oxygen containing groups (e.g., epoxide, hydroxide, and a carboxylate (COOH)).

In some embodiments, the graphenic component provided in a fiber, yarn, fluid stock, or the like herein is an oxidized graphene component (e.g., graphene oxide). In certain embodiments, oxidized graphene components are converted to reduced materials via reductive reaction conditions, such as through thermal, irradiation, chemical, and/or other processes described herein. In specific embodiments, thermal conditions using reductive (e.g., hydrogen gas, hydrogen gas mixed with an inert gas, or the like) or inert atmosphere (e.g., nitrogen gas, argon gas, or the like) is utilized. In specific embodiments, the oxidized graphene component is a graphene component functionalized with oxygen, such as with carbonyl groups, carboxyl groups (e.g., carboxylic acid groups, carboxylate groups, COOR groups, such as wherein R is a C1-C6 alkyl, or the like), —OH groups, epoxide groups, ether, and/or the like. In certain embodiments, the oxidized graphene component (or graphene oxide) comprises about 60% or more carbon (e.g., 60% to 99%). In more specific embodiments, the oxidized graphene component comprises about 60 wt. % to about 90 wt. % carbon, or about 60 wt. % to about 80 wt. % carbon. In further or alternative specific embodiments, the oxidized graphene component comprises about 40 wt. % oxygen or less, such as about 10 wt. % oxygen to about 40 wt. % oxygen, about 35 wt. % oxygen or less, about 1 wt. % to 35 wt. % oxygen, or the like. In various instances, oxidized graphene included graphene oxide, such as illustrated by the non-limiting exemplary structures in FIG. 1, and/or reduced graphene oxide, such as illustrated by the non-limiting exemplary structures in FIG. 2.

In certain embodiments, the graphenic component (e.g., reduced graphene oxide) comprises about 60% or more carbon (e.g., 60% to 99%), such as about 70 wt. % or greater, about 75 wt. % or more, about 80 wt. % or greater, about 85 wt. % or greater, about 90 wt. % or greater, or about 95 wt. % or greater (e.g., up to about 99 wt. % or more). In certain embodiments, the graphene component (e.g., rGO) comprises about 35 wt. % or less (e.g., 0.1 wt. % to 35 wt. %) oxygen, e.g., about 25 wt. % or less (e.g., 0.1 wt. % to 25 wt. %) oxygen, or about, about 20 wt. % or less, about 15 wt. % or less, about 10 wt. % or less (e.g., down to about 0.01 wt. %, down to about 0.1 wt. %, down to about 1 wt. % or the like) oxygen. In specific embodiments, the graphene component (e.g., rGO) comprises about 0.1 wt. % to about 10 wt. % oxygen, e.g., about 4 wt. % to about 9 wt. %, about 5 wt, % to about 8 wt, %, or the like. In certain embodiments, e.g., wherein an oxidized carbon inclusion material (e.g., graphene component) is reduced, higher ratios of carbon to oxygen are contemplated for the graphene component.

In some embodiments, processes described herein are useful for high throughput processing of graphenic components (e.g., oxidized graphene components) to form highly uniform fibers and yarns. In certain embodiments, higher concentrations of graphenic inclusion components are able to be processed than are possible using conventional techniques. In certain embodiments, a fluid stock provided herein comprises at least 0.5 wt. %, or at least 1 wt. % graphenic component, e.g., at least 2 wt. % graphenic component, at least 2.5 wt. % graphenic component, at least 3 wt. % component, at least 5 wt. % graphenic component, or the like (e.g., up to 15 wt. %, up to 10 wt. %, or the like). In certain embodiments, the fluid stock comprises about 2 wt. % to about 15 wt. % (e.g., about 10 wt. % to about 15 wt. %) graphenic component.

The additive is present in a fluid stock provided herein in any concentration desired and up to which processing according to a process or using a system described herein is possible. In some instance, processing a fluid stock with a controlled gas steam, such as described in certain instances herein, allows for the processing of fluid stocks comprising very high concentrations of polymer and/or graphenic component. In some instances, the concentration of the additive in the fluid stock is up to about 70 wt. %. In specific embodiments, the concentration of the additive in the fluid stock is about 5 wt. % to about 50 wt. %.

In some embodiments, the graphene component is an oxidized form of graphene (e.g., graphene oxide). In certain embodiments, processes utilized herein use oxidized forms of graphene because it is, in some instances, easier to solubilize, manipulate, disperse, and/or otherwise process such forms of graphenic components. In some embodiments, fibers provided herein comprise oxidized forms of graphenic components (e.g., graphene oxide) embedded therewithin, such as as precursors to graphenic fibers comprising graphene or reduced graphene oxide. In specific embodiments, a fiber provided herein comprises graphene. In specific embodiments, the graphene is a high aspect ratio graphene (e.g., wherein the length is significantly longer than the width thereof). In certain instances, thermal treatment of a lower aspect ratio graphenic component precursor (e.g., graphene oxide) fuses a plurality (more than one) graphenic component precursor to form a longer, second graphenic component (e.g., that extends along a longer portion, such as up to the entire length, of the fiber). In addition, in some instances, thermal treatment reduces (i.e., reduces the oxidation state or oxygen content of) the graphenic component and/or repairs defects within the graphenic lattice.

In some embodiments, provided herein is a graphenic fiber comprising one or more graphenic component. In some instances, the graphenic fiber comprises a plurality of the graphenic components collectively form a continuous morphology within the graphenic fiber. In specific embodiments, the continuous morphology extends at least 20% the length of the fiber. In more specific embodiments, the continuous morphology extends at least 40% the length of the fiber. In still more specific embodiments, the continuous morphology extends at least 60% the length of the fiber. In yet more specific embodiments, the continuous morphology extends at least 80% the length of the fiber. In certain embodiments, the graphenic fiber comprises a continuous graphenic component (e.g., a continuous graphene). In specific embodiments, the continuous graphenic component extends at least 20% the length of the fiber. In more specific embodiments, the continuous graphenic component extends at least 40% the length of the fiber. In still more specific embodiments, the continuous graphenic component extends at least 60% the length of the fiber. In yet more specific embodiments, the continuous graphenic component extends at least 80% the length of the fiber.

In certain embodiments, a fiber provided herein further comprises a polymer. In specific embodiments, the fiber comprises a continuous polymer matrix, such that extends along a signification portion of the length of the fiber. In some embodiments, the continuous matrix extends at least 20% the length of the fiber. In more specific embodiments, the continuous matrix extends at least 40% the length of the fiber. In still more specific embodiments, the continuous matrix extends at least 60% the length of the fiber. In yet more specific embodiments, the continuous matrix extends at least 80% the length of the fiber.

In some embodiments, provided herein is a graphenic fiber comprising a very high aspect ratio graphenic component (e.g., as obtained by the fusing of graphenic components forming a continuous matrix within a (precursor) fiber described, such as by thermal treatment). In certain embodiments, the graphene has an aspect ratio of at least 10. In preferred embodiments, the graphene has an aspect ratio of at least 100. In specific embodiments, the graphene has an aspect ratio of at least 250. In more specific embodiments, the graphene has an aspect ratio of at least 500. In still more specific embodiments, the graphene has an aspect ratio of at least 1,000. In yet more specific embodiments, the graphene has an aspect ratio of at least 10,000. In some embodiments, the high aspect ratio graphene is substantially aligned (e.g., within 15 degrees (e.g., within 10 degrees, within 5 degree, within 3 degrees, or the like) of the longitudinal axis on average, such as determined on a point by point basis along the fiber) with the fiber within which it is embedded or which it forms.

In certain embodiments, fibers or filaments provided herein have any suitable diameter (e.g., on average). In some embodiments, the fibers have a diameter that is small enough to reduce or minimize shell/core effects (e.g., the effect where the shell and the core have significantly different performance characteristics, particularly wherein the shell performance characteristics are significantly better than those of the core). In certain embodiments, a fiber (filament) provided herein has an average diameter of about 5 micron or less. In specific embodiments, provided herein is a fiber that has an average diameter of about 2 micron or less. In more specific embodiments, provided herein is a fiber that has an average diameter of about 20 nm to about 2 micron. In certain embodiments, provided herein is a yarn comprising a plurality of graphenic fibers, such fibers having an average diameter of about 5 micron or less. In specific embodiments, provided herein is a yarn comprising a plurality of graphenic fibers, such fibers having an average diameter of about 2 micron or less. In more specific embodiments, provided herein is a yarn comprising a plurality of graphenic fibers, such fibers having an average diameter of about 20 nm to about 2 micron.

Provided in certain embodiments herein are process for preparing a fiber or yarn described herein. In specific embodiments, provided herein is a process for preparing a graphenic fiber or yarn, such as described herein. In more specific embodiments, the process comprises:
a. providing a fluid stock, the fluid stock comprising a graphenic component and a liquid medium;
b. injecting the fluid stock with or into one or more fluid medium (e.g., a coagulant bath or a gas stream); and
c. bundling a plurality of fibers into a yarn (e.g., when making a yarn).

In some embodiments, injection of the fluid stock into the one or more fluid medium (e.g., gas stream) provides one or more fiber. In certain embodiments, one or more fluid stock is injected with or into a plurality of gas streams and/or a plurality of liquid mediums (e.g., coagulant baths), such as with a plurality of nozzles. In some embodiments, the fluid stock and a gas stream are provided to (e.g., an electrospin) nozzle, the nozzle being configured to eject the fluid stock (e.g., as a jet) with or into the fluid medium (e.g., gas stream). In certain embodiments, the fluid stock is provided to a plurality of such nozzles to produce a plurality of fibers. In other embodiments, a single nozzle produces a plurality of fibers, a fiber mat, or a long or continuous fiber. In some instances wherein a fiber mat or long or continuous fiber is produced, segments thereof are aligned to form the bundled to form the yarns described herein. Such instances wherein a plurality of fiber segments are bundled are included in the iterations of bundling a "plurality of fibers" described herein.

In specific embodiments, a process provided herein comprises:
a. providing a fluid stock, the fluid stock comprising a graphenic component and a liquid medium;
b. electrostatically charging the fluid stock;
c. injecting the fluid stock with or into one or more fluid medium (e.g., gas stream or liquid medium); and
d. bundling a plurality of fibers into a yarn (e.g., when forming a yarn; the step is absent if just a fiber is formed).

In some embodiments, any process herein uses a fluid stock further comprising a polymer. In certain instances, use of a polymer facilitates fine fiber formation. In some instances, fine graphenic fibers (e.g., precursor fibers or precursors comprising oxidized graphene, such as graphene oxide) are processed into graphene fibers. In certain instances, formation of the fine fibers that are bundled, rather than single large fibers facilitates the reduction of core/shell effects and/or improves performance characteristics, such as strength and/or strength-to-weight ratios.

In some embodiments, provided herein is a process for manufacturing a graphenic fiber or yarn, the process comprising:
a. providing a fluid stock, the fluid stock comprising a graphenic component and a liquid medium;
b. injecting the fluid stock with or into one or more fluid medium (e.g., gas stream or liquid medium); and
c. bundling a plurality of fibers into a yarn (e.g., when forming a yarn; the step is absent if just a fiber is formed).

In specific embodiments, provided herein is a process for manufacturing a graphenic fiber or yarn, the process comprising:
a. providing a fluid stock, the fluid stock comprising a graphenic component, a liquid medium, and an optional polymer;
b. electrostatically charging the fluid stock (e.g., and providing the fluid stock or electrostatically fluid stock to one or more nozzle outlet, such as to provide a fiber or plurality of fibers (e.g., and injecting the electrostatically charged fluid stock into a fluid medium, such as a liquid medium or gas stream); and
c. bundling a plurality of fibers into a yarn (e.g., when forming a yarn; the step is absent if just a fiber is formed).

In some embodiments, provided herein is a process for manufacturing a graphenic fiber or yarn, the process comprising:
a. providing a fluid stock, the fluid stock comprising a polymer, a liquid medium, and a graphenic component;
b. providing the fluid stock to a first inlet of a first conduit of a nozzle apparatus, the first conduit being enclosed along the length of the first conduit by a first wall having an interior surface and an exterior surface, the first conduit having a first outlet;
c. providing a gas to a second inlet of a second conduit of the nozzle apparatus, the second conduit being enclosed along the length of the second conduit by a second wall having an interior surface, the second conduit having a second outlet, and at least a portion of the second conduit being positioned along (e.g., one or more side of) and/or in at least partially surrounding relation to the first conduit; whereby a gas stream (e.g., high velocity gas) is provided at the second outlet;

d. providing a voltage to the nozzle apparatus; and e. bundling a plurality of fibers into a yarn (e.g., when forming a yarn; the step is absent if just a fiber is formed).

In certain embodiments, certain embodiments, a process provided herein comprises providing one or more gas stream (s) in at least partially surrounding relation to the injected fluid stock. In specific embodiments, the gas stream and the fluid stock are provided to a nozzle, such as wherein the gas stream and fluid stock are ejected from the nozzle in proximity to one another. In some instances, the nozzle is configured to eject the one or more gas stream along (e.g., alongside) the ejected fluid stock. In specific instances, the one or more gas stream is ejected along (e.g., alongside) the ejected fluid stock is ejected in a surrounding relation to the ejected fluid stock. In some specific embodiments, the at least one gas stream is ejected in an at least partial surrounding relation to the ejected fluid stock. In more specific embodiments, the at least one gas stream is ejected in a completely surrounding relation to the ejected fluid stock. In specific embodiments, the fluid stock is injected into one or more gas stream (e.g., when ejected from a nozzle herein), such as wherein the gas stream surrounds the injected fluid stock.

Figure 3:
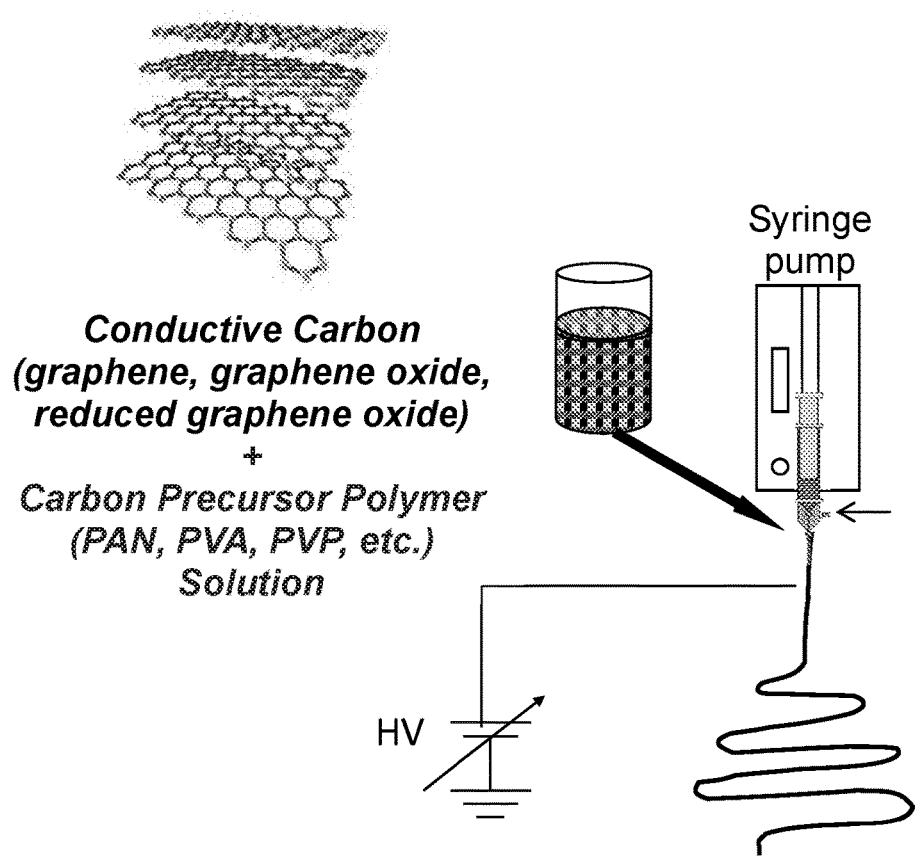
FIG. 3 illustrates an exemplary schematic of a system for preparing an exemplary graphenic/polymer composite fiber provided herein.
Figure 4:
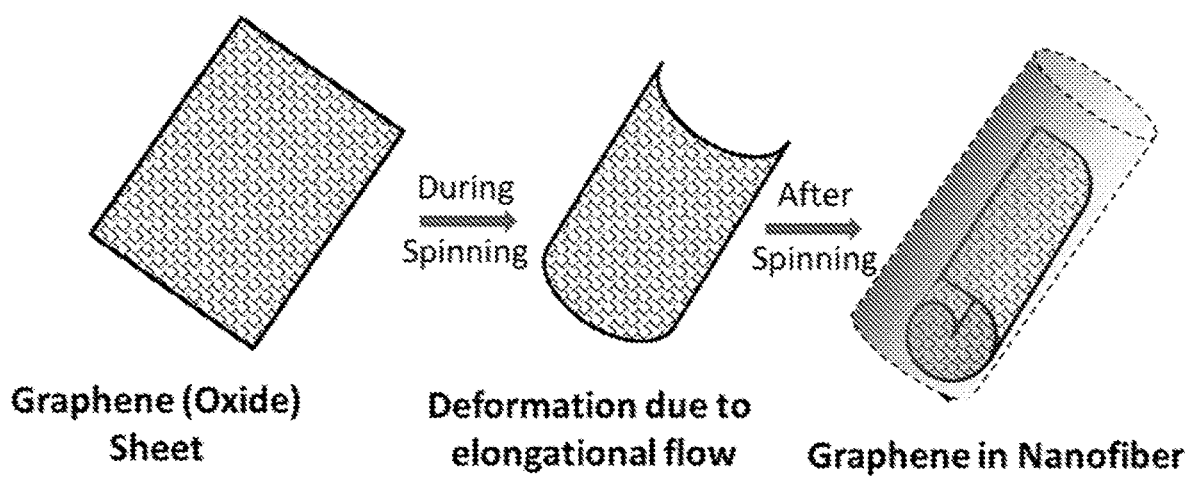
FIG. 4 illustrates an exemplary schematic of rolling/folding of individual graphenic components within a fiber herein.
Figure 5:
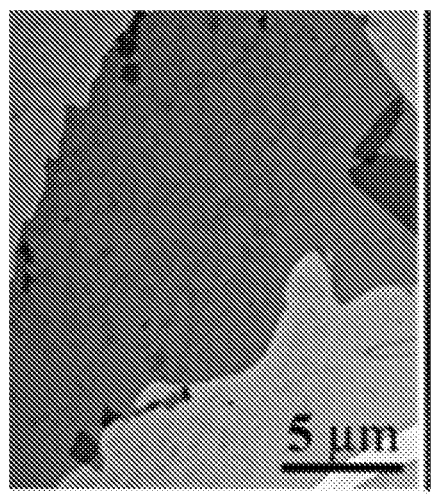
FIG. 5 illustrates a TEM image of an exemplary GO sheet included in a sub-micron fiber provided herein.
Figure 6:
FIG. 6 illustrates a TEM image of an exemplary microtomed graphenic/polymer (GO/PVA) fibers (1.2% GO).
Figure 7:
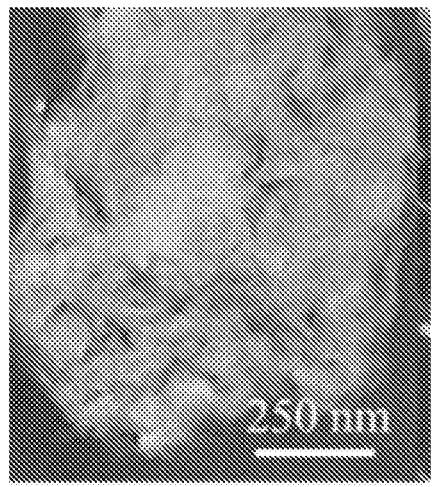
FIG. 7 illustrates a TEM image of an exemplary microtomed graphenic/polymer (GO/PVA) fibers (6% GO).

FIG. 3 illustrates a non-limiting, exemplary schematic of a process herein. As illustrated, a fluid stock is prepared by combining a conductive carbon with a carbon precursor polymer (e.g., PAN, PVA, PVP, or the like) solution. The fluid stock is fed through a nozzle, such as an electrospinning nozzle to produce graphenic fibers. FIG. 4 illustrates a schematic of how large, two-dimensional graphenic components are deformed during the spinning process and, ultimately, fold or roll in fiber form, such as when prepared according to a process herein. As illustrated, a large graphenic sheet is capable of fitting into a fiber having a diameter smaller than both the width and the length of the graphenic sheet. FIG. 5-FIG. 7 illustrates TEM images of actual materials demonstrating the same effect. FIG. illustrates a large graphenic component (graphene oxide). As is illustrated, the lateral dimension of the graphenic component is much greater than 5-10 micron, whereas the resulting fibers illustrated in FIG. 5 and FIG. 6 are much smaller than 1 micron in diameter.

In certain embodiments, a fluid stock is injected into or with a gas stream via a nozzle provided herein. In some embodiments, the nozzle provides the fluid stock via a stock conduit and the gas stream via one or more gas conduit, wherein the stock conduit and the one or more gas conduit(s) have an average direction that is within 15 degrees of one another. In more specific embodiments, such conduits are within 10 degrees of one another. In still more specific embodiments, such conduits are within 5 degrees (e.g., within 3 degrees) of one another. In certain embodiments, the stock conduit and the gas conduit(s) are enclosed by one or more wall thereof, the direction of the outer or distal wall of the gas conduit(s) being within 15 degrees (e.g., on average) of the wall enclosing the stock conduit. In more specific embodiments, the angles are within 10 degrees, 5 degrees, 3 degrees, or the like.

In some embodiments, a process provided herein comprises providing a fluid stock and a pressurized (e.g., via canister or pump) gas to a nozzle (e.g., to a stock conduit and one or more gas conduits thereof, respectively), such as an electrospinning nozzle, provided herein.

In some embodiments, a process herein comprises providing a voltage to a nozzle described herein, such as to provide a charge to a stock provided herein. In various embodiments, any suitable voltage (e.g., direct current voltage) is applied (e.g., to the nozzle). In specific embodiments, the voltage applied about 8 kV to about 30 kV. In more specific embodiments, the voltage applied is about 10 kV to about 25 kV. In certain embodiments, a power supply is configured to provide the voltage to the nozzle.

In some embodiments, the one or more gas stream(s) provided according to a process herein are provided at an (e.g., average) angle that does not deviate by greater than 15 degrees from the angle at which the stock is provided. In more specific embodiments, the angle of deviation is less than 10 degrees. In still more specific embodiments, the angle of deviation is less than 5 degrees. In still more specific embodiments, the angle of deviation is less than 3 degrees. In some embodiments, the angle of deviation is determined by the average of each of the one or more gas streams and/or the circumferentially averaged direction of the one or more gas streams, collectively.

The process of any one of the preceding claims, wherein the one or more gas stream(s) do not have an angle of deviation of greater than 15 degrees (e.g., less than 10 degrees, less than 5 degrees, less than 3 degrees, or the like) relative to the fluid stock injected therein or therewith.

In some embodiments, the gas stream is a high velocity gas stream. In some instances, a high velocity gas stream facilitates the extrusion or spinning of the stock, particularly viscous stock comprising a graphenic component. In some instances, the stock is highly viscous, e.g., comprising both a graphenic component and polymer. In certain embodiments, the gas stream (e.g., at the nozzle or outlet of the one or more gas conduit(s)) has a velocity of at least 0.05 m/s. In some embodiments, the velocity is at least 0.1 m/s. In specific embodiments, the velocity is at least 0.5 m/s. In more specific embodiments, the velocity is at least 1 m/s. In still more specific embodiments, the velocity is at least 5 m/s, such as at least 10 m/s, at least 25 m/s, at least 50 m/s or the like.

In certain embodiments, a process herein provides or a system herein is configured to provide a pressurized gas to an outer inlet of an outer conduit of a nozzle. In some embodiments, the outer conduit is enclosed along the length of the conduit by an outer wall having an interior surface, the outer conduit having an outer conduit inlet and an outer conduit outlet. In some instances, the pressurized gas is provided from a pressurized canister, by a pump, or by any other suitable mechanism. Generally, providing pressurized gas to the inlet of the outer channel results in a high velocity gas being discharged from the outlet of the outer channel of the nozzle. Any suitable gas pressure or gas velocity is optionally utilized in processes and/or systems herein. In specific embodiments, the gas pressure applied (e.g., to the inlet of the outer channel) is about 15 psi or more. In more specific embodiments, the gas pressure is about 20 psi or more, about 25 psi or more, or about 40 psi or more. In certain embodiments, the velocity of the gas at the nozzle (e.g., the outlet of the outer channel thereof) is about 0.5 m/s or more, about 1 m/s or more, about 5 m/s or more, about 25 m/s or more, or the like. In more specific embodiments, the velocity is about 50 m/s or more. In still more specific embodiments, the velocity is about 100 m/s or more, e.g., about 200 m/s or more, or about 300 m/s. In certain embodiments, the gas is any suitable gas, such as comprising air, oxygen, nitrogen, argon, hydrogen, or a combination thereof.

In various embodiments, the fluid stock is provided to the nozzle at any suitable flow rate, such as about 0.01 mL/min or more, about 0.05 mL/min or more, about 0.1 mL/min or more, about 0.2 mL/min or more, or about 0.01 mL/min to about 10 mL/min. In certain embodiments, the fluid stock is provided to the (e.g., first) inlet at a rate of about 0.01 to about 10 mL/min, e.g., about 0.05 mL/min to about 5 mL/min, or about 0.5 mL/min to about 5 mL/min.

In certain embodiments, a process of injecting a stock into a gas stream herein and/or a process of electrostatically charging a stock herein (e.g., and ejecting the electrostatically charged stock, such as as a jet, from a nozzle or stock conduit thereof) provides a fiber or plurality of fibers. In certain embodiments, the fiber or fibers are collected, such as in a web or non-woven mat, prior to bundling the fiber (e.g., fiber segments thereof) or fibers into a yarn, such as described herein. In some embodiments, the fiber or fibers are collected on or in proximity to a collector, such as a grounded collector. In some instances, use of a grounded collector facilitates improved control over fiber web/mat formation, which in certain instances facilitates the bundling thereof. In certain embodiments, the collector rotates relative to a nozzle ejecting a stock, such as a nozzle described herein. In certain embodiments, the collector is spinning or rotating. In further or alternative embodiments, the nozzle rotates around the collector.

In certain embodiments, a process provided herein further comprises washing or otherwise exposing the fibers, yarns, webs, mats, or the like prepared according to a process herein with a solvent, such as water, alcohol, or other suitable solvent. In some embodiments, washing facilitates removal of a polymer, such as to reduce polymer and/or non-graphenic carbon content (e.g., following carbonization of a polymer) in the fibers, yarns or other materials described herein, such as prepared according to a process herein. In further or alternative embodiments, the solvent facilitates bundling or coagulation of the fibers produced by a process herein, such as in a coagulation bath. In some embodiments, a process herein comprises spinning (e.g., electrospinning) a stock herein to provide a jet or fibers, which are spun or otherwise ejected into a bath, such as a flowing bath. In some instances, the bath is flowing in a direction away from the spinning nozzle. In certain embodiments, the bath (e.g., flowing bath) facilitate bundling of the fibers, such as into yarns described herein.

In certain embodiments, provided herein is a composition comprising a liquid medium or solvent and a fiber and/or yarn provided herein (e.g., a coagulation bath comprising a fiber, yarn, and fluid medium, such as a flowing fluid medium). In some instances, the fiber and/or yarn comprise a polymer. In certain instances, the polymer is not soluble in the fluid medium. In other embodiments, the polymer is at least partially soluble in the fluid medium, at least partially removing polymer from the fiber and/or yarn. In certain embodiments, a composition provided herein comprises a fluid medium, a fiber and/or yarn provided herein, and a polymer (e.g., dissolved in the fluid medium). Any suitable fluid medium or solvent is optionally utilized, such as water, alcohol (e.g., methanol, alcohol, propanol, or the like), alkane (e.g., heptane), haloalkane (e.g., dichloromethane or chloroform), benzene, toluene, xylene, or the like. In preferred embodiments, the fluid medium comprises water and/or ethanol.

In some embodiments, the fluid medium is a liquid medium, such as a coagulation bath (e.g., wherein the process is known as "wet spinning"). In certain embodiments, the liquid medium is an aqueous medium. In some embodiments, the liquid medium (e.g., aqueous medium) comprises a surfactant or salt. In specific embodiments, the surfactant is an ionic (e.g., cationic) surfactant. In specific embodiments, the ionic surfactant comprises a hydrocarbon group, such as a fatty alkyl (e.g., an alkyl comprising from 6-26 carbons, 10-26 carbons, 14-22 carbons, or the like). In some embodiments, the ionic surfactant comprises a carboxylate, a sulphonate, a sulphate, a quaternary ammonium, or a phosphate. In specific embodiments, the ionic surfactant comprises a quaternary ammonium group. In some embodiments, exemplary surfactants comprising a fatty alkyl group and a quaternary ammonium include, by way of non-limiting example, hexadecyltrimethylammonium bromide (CTAB), dodecyltrimethylammonium bromide (DTAB), distearyldimethylammonium chloride, and diethyl ester dimethyl ammonium chloride.

In certain embodiments, the liquid medium is heated, such as to a temperature of about 30° C. or more. In specific embodiments, the liquid medium has a temperature of about 30° C. to about 60° C. In more specific embodiments, the liquid medium has a temperature of about 40° C. to about 55° C.

In some embodiments, fibers or yarns produced in a process herein is further chemically and/or thermally treated, such as to reduce and/or pyrolyze the graphenic and/or polymer components thereof. In certain embodiments, the fiber or yarn is thermally treated. In specific embodiments, the fiber or yarn is thermally treated at a temperature suited to reduce the oxidized graphenic component (e.g., graphene oxide (GO)) to a reduced graphenic component, such as reduced graphene oxide (rGO) or graphene. In some embodiments, the fiber or yarn is thermally treated at a temperature suitable for fusing adjacent graphenic components to form a longer graphenic component (e.g., graphene). In certain embodiments, the fiber or yarn is thermally treated under conditions suitable for carbonizing the polymer to a non-graphenic carbon (e.g., amorphous and/or graphitic carbon) (e.g., at elevated temperature under inert or reductive conditions). In some embodiments, the fiber or yarn is thermally treated under conditions suitable for removing or reducing the amount of non-graphenic component (e.g., polymer) present in the fiber or yarn.

In certain embodiments, a process herein comprises thermally treating a fiber or yarn herein, such as produced herein, to a temperature of at least 1200° C. In preferred embodiments, the process comprises thermally treating the fiber or yarn herein to a temperature of at least 1500° C. In specific embodiments, the process comprises thermally treating the fiber or yarn to a temperature of at least 2000° C. In more specific embodiments, the process comprises thermally treating the fiber or yarn to a temperature of at least 2500° C. In still more specific embodiments, the process comprises thermally treating the fiber or yarn to a temperature of about 3000° C., or more. In certain embodiments, such thermal treatment removes (e.g., at least partially) the polymer of a graphenic/polymer fiber or yarn, such as provided herein. In some embodiments, the polymer is carbonized and/or removed (e.g., via combustion or burning of the polymer with oxygen).

In certain embodiments, thermal treatment provides a reduced graphenic component (e.g., less oxygen content) of a fiber or yarn. In some instances, other reductive techniques (e.g., chemical techniques) are employed in the alternative or in addition to thermal treatment techniques. In certain embodiments, graphenic components of fibers and/or yarns provided herein (e.g., post-reductive treatment) have a low oxygen content, such as less than 5 wt. %. In some embodiments, graphenic fibers and/or yarns provided herein are less than 3 wt. % oxygen. In specific embodiments, graphenic fibers and/or yarns provided herein are less than 1 wt. % oxygen. In more specific embodiments, graphenic fibers and/or yarns provided herein are less than 0.5 wt. % oxygen. In still more specific embodiments, graphenic fibers and/or yarns provided herein are less than 0.2 wt. % oxygen.

In some embodiments, thermal treatment provides a fused graphenic component, such as wherein a plurality of graphenic components of the spun stock are fused together along the length of the fiber, such as forming a continuous or high aspect ratio graphenic component within the fiber, such as wherein the graphenic component has an aspect ratio (length/width) of at least 10, at least 50, at least 100, or the like. In certain embodiments, a stock or non-fused graphenic component provided herein has a lateral dimension (e.g., length or longest dimension) of at least 10 micron, at least 15 micron, or, more preferably, at least 20 micron. In some embodiments, the fused graphenic component provided herein has a lateral dimension (e.g., length or longest dimension) of at least 100 micron, at least 200 micron, at least 500 micron, at least 1 mm, at least 2 mm, at least 5 mm, or the like.

In certain embodiments, fibers or yarns provided herein (e.g., post thermal treatment) comprise graphenic components with high aspect ratios and/or low defects. In some instances, high aspect ratio graphenic components are substantially aligned with the fiber construct (e.g., as graphenic components thereof are fused during thermal treatment to produce one or more higher aspect ratio graphenic component (e.g., with reduced oxygen content and/or fewer defects)). In certain embodiments, the aspect ratio of a graphenic component herein is at least 1.5 times, at least 2 times, at least 3 times, at least 5 times, at least 10 times, at least 25 times, at least 50 times, or more as large as the aspect ratio of the graphenic component prior to thermal treatment. In some embodiments, the oxygen content of the post-thermal treatment graphenic component herein is less than 50%, less than 25%, less than 10%, less than 5%, or less the oxygen content of the pre-thermal treatment graphenic component herein.

In certain embodiments, provided herein is a fluid stock comprising a graphenic component. In more specific embodiments, the fluid stock comprises a graphenic component and a polymer. In some embodiments, high concentrations of graphenic component relative to polymer is desired, such as to improve yield of graphenic fibers if and when polymer is removed and/or carbonized. In certain embodiments, the weight ratio of graphenic component to polymer present in a fluid stock herein is at least 1:10. In preferred embodiments, the weight ratio of graphenic component to polymer is at least 1:8. In specific embodiments, the weight ratio of graphenic component is about 1:6. In more specific embodiments, the weight ratio of graphenic component is about 1:5. In still more specific embodiments, the weight ratio of graphenic component is about 1:4. In yet more specific embodiments, the weight ratio of graphenic component is about 1:3. In certain embodiments, the weight ratio of graphenic component is up to about 1:1, or more.

In addition, in some embodiments, high loading of the graphenic component and polymer in the fluid stock is desired, such as to improve throughput, fiber/yarn uniformity, fiber/yarn continuity, and performance characteristics. Generally, such high loading of inclusion materials into the fluid stock results in high viscosities in the stocks, which are difficult or impossible to extrude, spin, or electrospin using conventional techniques. In some instances, gas assisted processes described herein facilitate the high throughput of highly viscous fluid stocks in the process herein. In certain embodiments, stocks provided herein have a viscosity of at least 5 cP.

In some embodiments, stocks provided herein have a viscosity of at least 10 cP. In specific embodiments, stocks provided herein have a viscosity of at least 20 cP. In more specific embodiments, stocks provided herein have a viscosity of at least 50 cP. In still more specific embodiments, stocks provided herein have a viscosity of at least 100 cP. In yet more specific embodiments, stocks provided herein have a viscosity of at least 250 cP. In more specific embodiments, stocks provided herein have a viscosity of at least 500 cP. In still more specific embodiments, stocks provided herein have a viscosity of up to 1,000 cP, or more.

In specific embodiments, a process described herein comprises providing a fluid stock to a first inlet of a first conduit of a nozzle, the first conduit being enclosed along the length of the conduit by a wall having an interior surface and an exterior surface, the first conduit having a first outlet. In specific instances, the walls of the first conduit form a capillary tube, or other structure. In some instances, the first conduit is cylindrical, but embodiments herein are not limited to such configurations.

Figure 8:
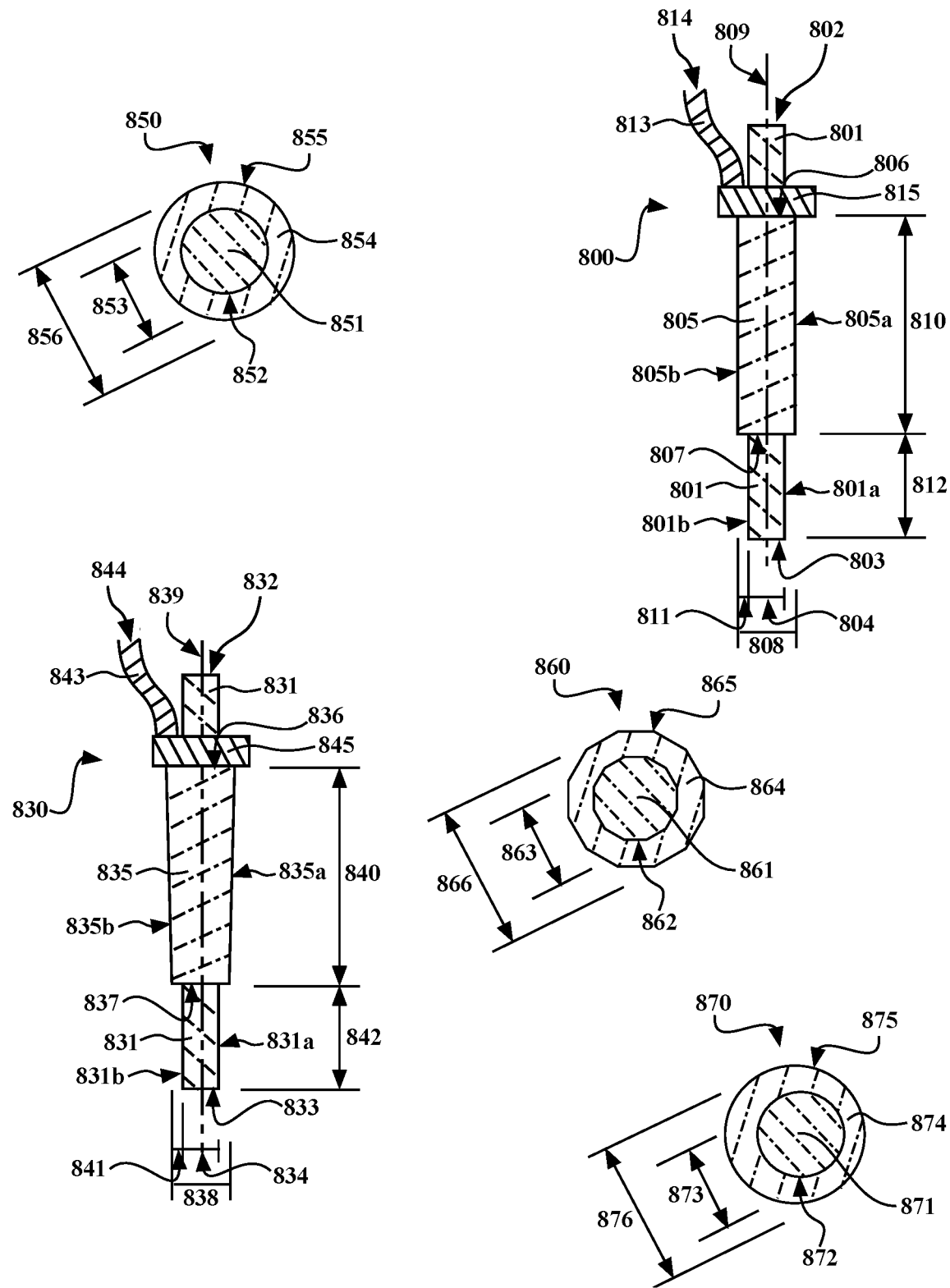
FIG. 8 illustrates a schematic of exemplary electrospray nozzle apparatuses provided herein.

FIG. 8 illustrates exemplary nozzle apparatuses 800 and 830 provided herein. Illustrated by both nozzle components 800 and 830 some embodiments, the nozzle apparatus comprises a nozzle component comprising a first (inner) conduit, the first conduit being enclosed along the length of the conduit by a first wall 801 and 831 having an interior and an exterior surface, and the first conduit having a first inlet (or supply) end 802 and 832 (e.g., fluidly connected to a first supply chamber and configured to receive a fluid stock) and a first outlet end 803 and 833. Generally, the first conduit has a first diameter 804 and 834 (e.g., the average diameter as measured to the inner surface of the wall enclosing the conduit). In further instances, the nozzle component comprising a second (outer) conduit, the second conduit being enclosed along the length of the conduit by a second wall 805 and 835 having an interior and an exterior surface, and the second conduit having a second inlet (or supply) end 806 and 836 (e.g., fluidly connected to a second supply chamber and configured to receive a gas—such as a high velocity or pressurized gas (e.g., air)) and a second outlet end 807 and 837. In some instances, the second inlet (supply) end 806 and 836 is connected to a supply chamber. In certain instances, the second inlet (supply) end 806 and 836 are connected to the second supply chamber via a supply component. FIG. 8 illustrates an exemplary supply component comprising a connection supply component (e.g., tube) 813 and 843 that fluidly connects 814 and 844 the supply chamber (not shown) to an inlet supply component 815 and 845, which is fluidly connected to the inlet end of the conduit. The figure illustrates such a configuration for the outer conduit, but such a configuration is also contemplated for the inner and any intermediate conduits as well. Generally, the first conduit has a first diameter 808 and 838 (e.g., the average diameter as measured to the inner surface of the wall enclosing the conduit). The first and second conduits have any suitable shape. In some embodiments, the conduits are cylindrical (e.g., circular or elliptical), prismatic (e.g., an octagonal prism), conical (e.g., a truncated cone—e.g., as illustrated by the outer conduit 835) (e.g., circular or elliptical), pyramidal (e.g., a truncated pyramid, such as a truncated octagonal pyramid), or the like. In specific embodiments, the conduits are cylindrical (e.g., wherein the conduits and walls enclosing said conduits form needles). In some instances, the walls of a conduit are parallel, or within about 1 or 2 degrees of parallel (e.g., wherein the conduit forms a cylinder or prism). For example, the nozzle apparatus 800 comprise a first and second conduit having parallel walls 801 and 805 (e.g., parallel to the wall on the opposite side of the conduit, e.g., as illustrated by 801*a*/801*b* and 805*a*/805*b*, or to a central longitudinal axis 809). In other embodiments, the walls of a conduit are not parallel (e.g., wherein the diameter is wider at the inlet end than the outlet end, such as when the conduit forms a cone (e.g., truncated cone) or pyramid (e.g., truncated pyramid)). For example, the nozzle apparatus 830 comprise a first conduit having parallel walls 831 (e.g., parallel to the wall on the opposite side of the conduit, e.g., as illustrated by 831*a*/831*b*, or to a central longitudinal axis 839) and a second conduit having non-parallel walls 835 (e.g., not parallel or angled to the wall on the opposite side of the conduit, e.g., as illustrated by 835*a*/835*b*, or to a central longitudinal axis 839). In certain embodiments, the walls of a conduit are within about 15 degrees of parallel (e.g., as measured against the central longitudinal axis, or half of the angle between opposite sides of the wall), or within about 10 degrees of parallel. In specific embodiments, the walls of a conduit are within about 5 degrees of parallel (e.g., within about 3 degrees or 2 degrees of parallel). In some instances, conical or pyramidal conduits are utilized. In such embodiments, the diameters for conduits not having parallel walls refer to the average width or diameter of said conduit. In certain embodiments, the angle of the cone or pyramid is about 15 degrees or less (e.g., the average angle of the conduit sides/walls as measured against a central longitudinal axis or against the conduit side/wall opposite), or about 10 degrees or less. In specific embodiments, the angle of the cone or pyramid is about 5 degrees or less (e.g., about 3 degrees or less). Generally, the first conduit 801 and 831 and second conduit 805 and 835 having a conduit overlap length 810 and 840, wherein the first conduit is positioned inside the second conduit (for at least a portion of the length of the first and/or second conduit). In some instances, the exterior surface of the first wall and the interior surface of the second wall are separated by a conduit gap 811 and 841. In certain instances, the first outlet end protrudes beyond the second outlet end by a protrusion length 812 and 842. In certain instances, the ratio of the conduit overlap length-to-second diameter is any suitable amount, such as an amount described herein. In further or alternative instances, the ratio of the protrusion length-to-second diameter is any suitable amount, such as an amount described herein, e.g., about 1 or less.

FIG. 8 also illustrates cross-sections of various nozzle components provided herein 850, 860 and 870. Each comprises a first conduit 851, 861 and 871 and second conduit 854, 864, and 874. As discussed herein, in some instances, the first conduit is enclosed along the length of the conduit by a first wall 852, 862 and 872 having an interior and an exterior surface and the second conduit is enclosed along the length of the conduit by a second wall 855, 865 and 875 having an interior and an exterior surface. Generally, the first conduit has any suitable first diameter 853, 863 and 864 and any suitable second diameter 856, 866, and 876. The cross-dimensional shape of the conduit is any suitable shape, and is optionally different at different points along the conduit. In some instances, the cross-sectional shape of the conduit is circular 851/854 and 871/874, elliptical, polygonal 861/864, or the like.

In some instances, coaxially configured nozzles provided herein and coaxial gas controlled electrospraying provided herein comprises providing a first conduit or fluid stock along a first longitudinal axis, and providing a second conduit or gas (e.g., pressurized or high velocity gas) around a second longitudinal axis (e.g., and electrospraying the fluid stock in a process thereof). In specific embodiments, the first and second longitudinal axes are the same. In other embodiments, the first and second longitudinal axes are different. In certain embodiments, the first and second longitudinal axes are within 500 microns, within 100 microns, within 50 microns, or the like of each other. In some embodiments, the first and second longitudinal axes are aligned within 15 degrees, within 10 degrees, within 5 degrees, within 3 degrees, within 1 degree, or the like of each other. For example, FIG. 8 illustrates a cross section of a nozzle component 870 having an inner conduit 871 that is off-center (or does not share a central longitudinal axis) with an outer conduit 874. In some instances, the conduit gap (e.g., measurement between the outer surface of the inner wall and inner surface of the outer wall) is optionally averaged—e.g., determined by halving the difference between the diameter of the inner surface of the outer wall 876 and the diameter of the outer surface of the inner wall 872. In some instances, the smallest distance between the inner surface of the outer wall 876 and the diameter of the outer surface of the inner wall 872 is at least 10% (e.g., at least 25%, at least 50%, or any suitable percentage) of the largest distance between the inner surface of the outer wall 876 and the diameter of the outer surface of the inner wall 872.

In certain embodiments, the conduits have any suitable diameter. In some embodiments, the diameter of the outer conduit is about 0.2 mm to about 10 mm, e.g., about 1 mm to about 10 mm. In more specific embodiments, the diameter of the outer conduit is about 0.2 mm to about 5 mm, e.g., about 1 mm to about 3 mm. In certain embodiments, the diameter of the inner conduit is about 0.05 mm (e.g., about 0.1 mm) to about 8 mm, e.g., about 0.5 mm to about 5 mm, e.g., about 1 mm to about 4 mm.

In preferred embodiments (e.g., wherein the stock is spun into a liquid medium—"wet spinning"), a fluid stock is spun, injected, ejected, or otherwise processed through a needle or conduit having an internal cross-sectional diameter or width of less than 0.4 mm, such about 0.35 mm or less, about 0.3 mm or less, or about 0.25 mm or less. In some instances, the conduit has an internal cross-sectional diameter of about 0.05 mm to about 0.4 mm, such as about 0.05 mm to about 0.35 mm, such as about 0.1 mm to about 0.3 mm. In certain embodiments, smaller needles are preferred, such as to provide a small enough amount of material to form a consistent fiber size upon spinning and coagulation, such as in a coagulation bath.

In some instances, as discussed herein, the a stock conduit is configured along and/or inside the gas conduit In some instances, such conduits are configured along an identical axis, but offset configurations are also considered to be within the scope of the instant disclosure. In some embodiments, an outer wall surrounds the gas conduit, the outer wall having an interior surface (e.g., defining the gas conduit). In some instances, offset configurations result in the touching of a side of the outer wall of the inner conduit to the inner wall of the outer conduit in one or more position, such configurations being within the scope of the "surrounded by" disclosure presented herein. In some embodiments, the average distance between the exterior surface of the stock conduit wall and the interior surface of the gas conduit wall (referred to herein as the conduit gap) is any suitable distance. In specific instances, the conduit gap is about 0.2 mm or more, e.g., about 0.5 mm or more. In more specific embodiments, the conduit gap is about 0.5 mm to about 5 mm. In certain embodiments, the gap is small enough to facilitate a high velocity gas at the nozzle and to facilitate sufficient disruption of the charged fluid (jet) ejected from the nozzle (e.g., such as to provide sufficiently small droplet sizes and sufficiently uniform inclusion dispersion in the plume and on the collection substrate). In some embodiments, the stock channel and the gas channel run along an identical or similar longitudinal axis, the length of which both the stock and gas channels running along that axis being the conduit overlap length. In some embodiments, the stock conduit length, the gas conduit length, and the conduit overlap length is about 0.1 mm to about 100 mm, or more. In specific embodiments, the stock conduit length, the gas conduit length, and the conduit overlap length is about 0.5 mm to about 100 mm, e.g., about 1 mm to about 100 mm, about 1 mm to about 50 mm, about 1 mm to about 20 mm, or the like. In certain embodiments, the ratio of the conduit overlap length to the first diameter being about 0.5 to about 10, e.g., about 1 to about 10. In some embodiments, the stock conduit is longer than the gas conduit, the stock conduit protruding beyond the gas conduit, e.g., as illustrated in FIG. 8. In some embodiments, the protrusion length is about –0.5 mm to about 1.5 mm, e.g., about 0 mm to about 1.5 mm.

Also provided in some embodiments herein are composites comprising a graphenic component, such as any yarn or fiber describe herein. In specific embodiments, provided herein are composites comprising graphenic yarns, such as high-graphene content yarns. In more specific embodiments, provided herein are composites comprising low defect, high-graphene content yarns. In some embodiments, the length of yarns provided herein, such as in composites herein, are at least 100 micron, at least 500 micron, at least 1 mm, at least 0.1 cm, at least 0.5 cm, at least 1 cm, at least 2 cm, or more. In some embodiments, the graphenic yarns are provided in a weave of woven mat, such as in a composite herein. Any suitable weight ratio of graphenic yarn to bulk material is optionally utilized. In exemplary embodiments, a comprise provided herein comprises a graphenic yarn-to-bulk matrix material weigh-to-weight ratio of about 1:20 to about 1:1, such as about 1:10 to about 1:5. Such composites are manufactured in any suitable manner, such as by embedding a yarn provided herein in a bulk matrix material described herein. In some embodiments, the process for preparing a composite herein further comprises the steps of preparing the yarn according to a process herein.

In various embodiments, any suitable bulk material is utilized herein, such as thermoplastic, a resin, a metal, or the like. In specific embodiments, the bulk material is epoxy, polyether ether ketone (PEEK), phenolic resin, or the like.

In various embodiments, composites provided herein are used in aerospace, automotive, civil engineering, or other applications. Provided herein are airplanes, helicopters, space-craft, automobiles (cars, trucks, etc.) comprising such composites. In various embodiments, such composites are used in the frame, fuselage, body, blades, or the like of such vehicles.

EXAMPLES

Example 1—GO/PVA Fluid Stock

A first stock fraction is prepared by charging graphene oxide (0.75 wt. %), the graphenic component, into an aqueous medium. The suspension is stirred until homogeneous. A second fraction stock is prepared by charging polyvinyl alcohol (PVA) into an aqueous medium (deionized water) (0.1 g polymer/mL medium). The mixture is stirred until homogenous (dissolved).

The fluid stock having a GO:PVA weight ratio of 1:10 is prepared by combining the first and second stock fractions in the appropriate amounts and stirring until homogenous.

Additional fluid stocks are prepared as described above, with GO:PVA weight ratios of 1:5, 1:3, and 1:2.

Example 2—Electrospinning GO/PVA

The fluid stock of Example 1 is electrospun by a gas-assisted technique. The overall process and apparatus is depicted in FIG. 1. The fluid stock is loaded into a syringe pump connected to a spinneret with an inner nozzle diameter (fluid stock) of $4.13 \times 10^{-4}$ m and an outer (air) diameter of $1.194 \times 10^{-3}$ m. The distance between the nozzle and the collector is about 15-20 cm and the fluid stock is spun at a rate of about 0.1-0.5 ml/min. A charge of about +15-25 kV is maintained at the collector. The air velocity at the nozzle is >5 m/s. The temperature of the air and fluid stock at the nozzle is about 300 K.

Example 3—GO/PVA Yarns (Rotating Collector)

Figure 9:
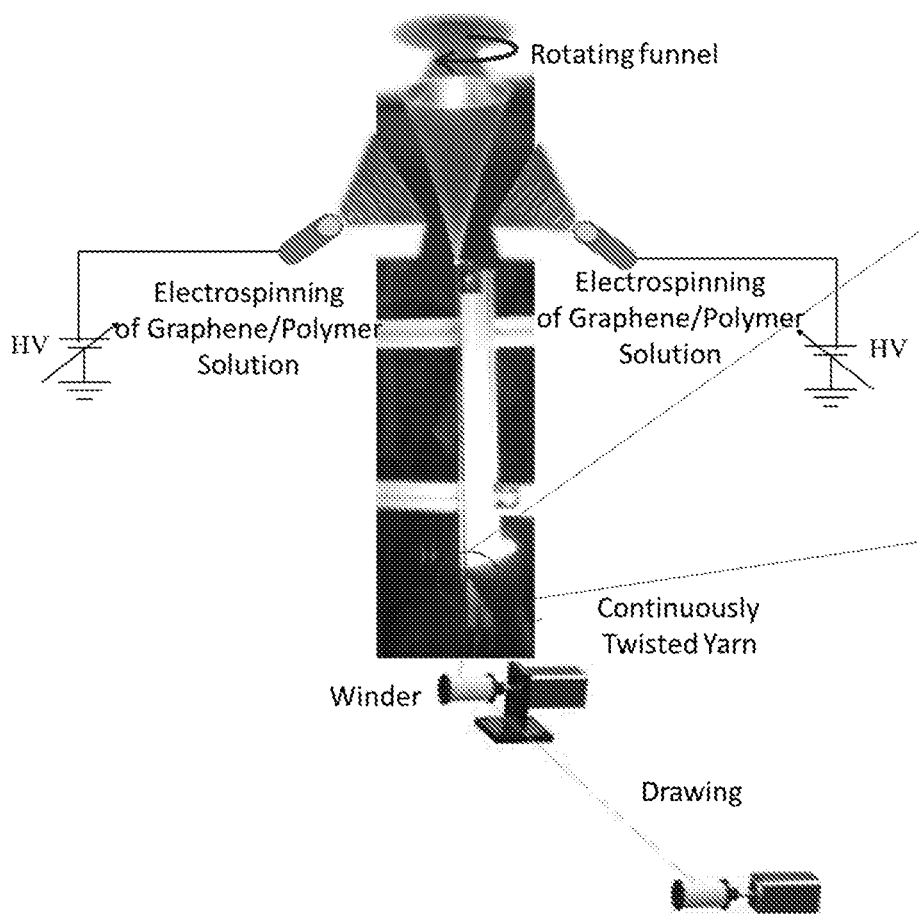
FIG. 9 illustrates a schematic of a system for preparing an exemplary twisted graphenic yarn provided herein.

The (grounded) collector of Example 2 is in the shape of a cone, with the open end facing the electrospinning nozzle. A pair of nozzles are located on opposite sides of the collector, as illustrated in the FIG. 9. As the fluid stock is electrospun, a fibrous web or mat forms on and in proximity to the collector. As the collector rotates, the fibrous web twists to form a twisted yarn, which is drawn and collected on a spool, such as illustrated in FIG. 9.

Example 4—GO/PVA Yarns (Coagulation Bath)

Figure 10:
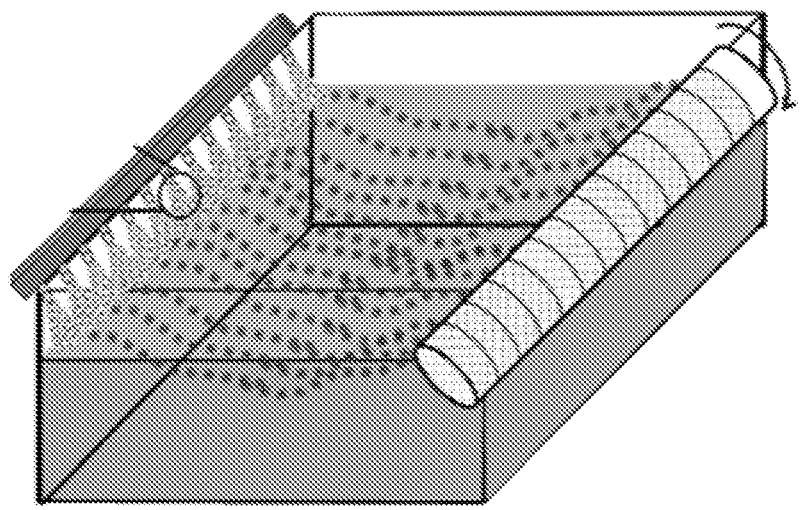
FIG. 10 illustrates an exemplary schematic of a system for preparing an exemplary (non-twisted) graphenic yarn provided herein.

Fluid stock is wet-spun or extruded through a spinning nozzle into a (e.g., flowing) fluid. As illustrated in FIG. 10, the spun fluid stock provides nanofibers within the fluid bath, the flowing nature of the bath and/or the winding collector serving to draw the fibers into a unidirectional manner, resulting in the alignment and (non-twisted) bundling thereof. The fluid bath of the liquid medium facilitates removal any residual fluid from the fluid stock, enhancing fiber formation. Use of a solvent incompatible with the polymer and/or graphene oxide facilitates further bundling of the fibers. Use of a solvent compatible with the polymer and incompatible with the graphene oxide facilitates removal of the polymer from the fibers and bundling of the resulting polymer-free (or reduced polymer content) fibers. Roll devices are used to draw the fibers (e.g., further facilitating graphenic alignment) and collected onto a spool.

Example 5—Calcined Yarns

The yarns collected in Examples 3 and 4 are collected and heated to about 3,000° C. in an inert (Ar) or reductive atmosphere ($H_2$/Ar) to provide a carbon-graphene composite yarn.

The yarns collected in Examples 3 and 4 are alternatively collected and heated to 1,200° C. in air to "burn" the polymer off, and then heated to about 3,000° C. in an inert (Ar) or reductive atmosphere ($H_2$/Ar) to provide a high graphene content yarn.

Example 6—Alternate Polymers

Following the procedure of Example 1, additional fluid stocks are similarly prepared using polyethene oxide (PEO) and polyacrylonitrile (PAN) (using DMF as polymer solvent). These fluid stocks are processed according to the Examples of 2-4 to form fibers and yarns therefrom, and calcined according to a process of Example 5 to produce carbon-graphene composite and/or high-graphene-content yarns.

Example 7—GO Wet Spinning

A variety of graphene oxide stocks are prepared, including aqueous stocks comprising about 0.5 wt. % exfoliated, large graphene oxide (e.g., about 20 micron or more); about 0.5 wt. % exfoliated, smaller graphene oxide (about 10 micron); 2 wt. % exfoliated, large graphene oxide; 2 wt. % exfoliated, smaller graphene oxide; and 2 wt. % multi-layered large graphene oxide. The stocks are electrospun into a liquid medium using a process similar to that described in Example 4, wherein the coagulation bath is comprises an aqueous solution comprising an ionic surfactant.

Observed results are that the low concentration (0.5 wt. %) GO solutions failed to form a continuous fiber upon spinning. Spinning of the 2 wt. % GO having a smaller size formed fibers (comprising aggregated GO), but such fibers were extremely brittle to the touch. Spinning of the 2 wt. % GO having a large size also formed brittle fibers (comprising aggregated GO), but were more well-formed than the GO fibers comprising the smaller GO. Spinning of the 2 wt. % GO having large, multi-layered GO resulted in the formation of well-formed, manageable and continuous fibers.

Figure 12:
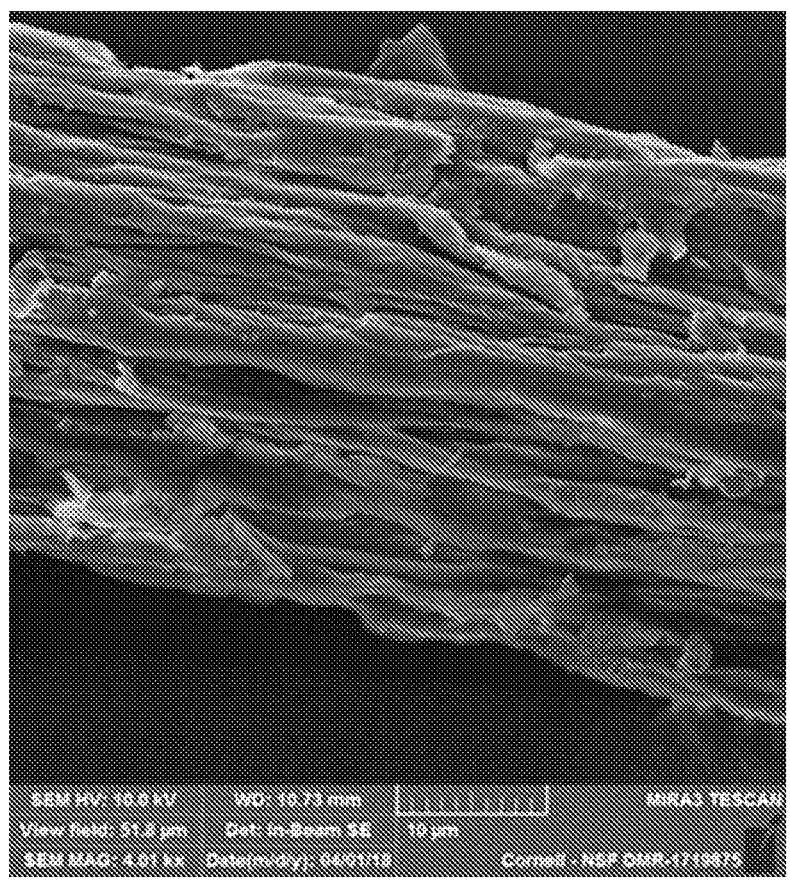
FIG. 12 illustrates a TEM image of an exemplary graphenic fiber provided herein (no thermal treatment).
Figure 13:
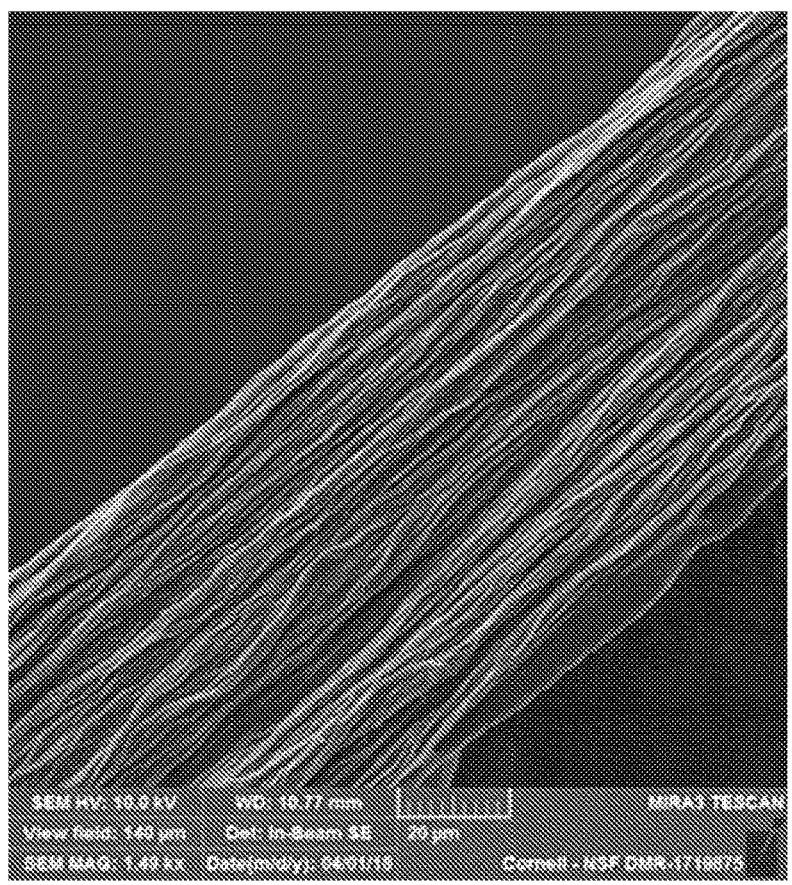
FIG. 13 illustrates a TEM image of an exemplary graphenic fiber provided herein (with thermal treatment).

Resultant fibers were collected and thermally treated. FIG. 12 illustrates an exemplary transmission electron microscopy (TEM) of the fibers prior to thermal treatment. FIG. 13 illustrates an exemplary transmission electron microscopy (TEM) of the fibers prior to thermal treatment. As can be observed, some alignment of the graphenic component is observed in the fibers prior to thermal treatment, but following thermal treatment, clear alignment of graphenic sheets are observed (FIG. 13).

Example 8—GO Wet Spinning Surfactant

Using a process similar to that in Example 7, multi-layered, large GO stocks are spun into a variety of liquid mediums. Various salts and solvents were utilized to form the coagulation bath/liquid medium. Salts, such as calcium chloride or sodium hydroxide, and surfactants, such as quaternary ammonium surfactants were dissolved or suspended in the solvent. When spinning into a bath comprising ethyl acetate with a salt, poor fiber formation was observed. Better results were observed when an aqueous solution was utilized with the salt, but a consistent, continuous fiber were not observed. Even better fiber formation was appeared to be observed when using a mixture of water and ethanol with the salt, but upon slight shaking of the sample, the fibers disintegrated. When using an aqueous ionic surfactant (quaternary ammonium) bath, however, very good results were obtained, with a continuous graphenic fiber collected.

Example 9—GO Wet Spinning Temperature

Figure 11:
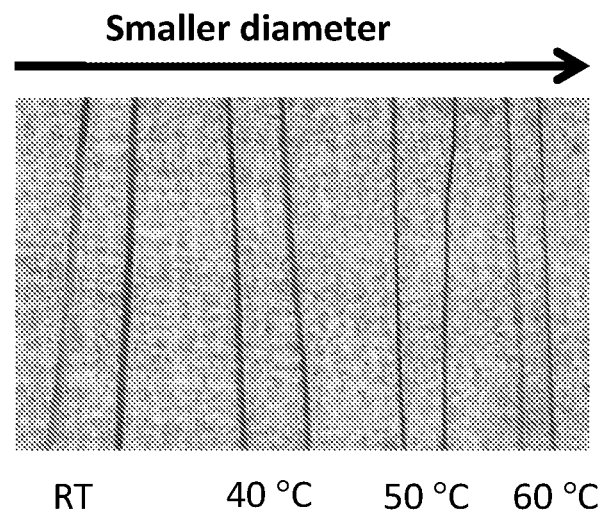
FIG. 11 illustrates images of exemplary graphenic fibers provided herein, such fibers prepared using coagulation baths held at various temperatures.

Using a process similar to that in Example 7, multi-layered, large GO stocks are spun into an aqueous bath comprising ionic surfactant, the bath being held constant at a given temperature. Bath temperatures included room temperature, 40° C., 50° C., and 60° C. When spinning into a room temperature bath and collecting the fiber on a graphite rod, large fibers are formed, but such fibers are difficult to remove from the graphite rod following drying. When spinning into a bath held at 40° C., the fibers are well formed and collected (rolled) onto a graphite rod. Following drying, the fibers were readily removed from the rod. Similar results were obtained when using a 50° C. bath, with improved ability to separate overlapping fibers from one another. Results similar to those obtained at 50° C. were obtained in the 60° C. bath, but the resultant fibers were more brittle and difficult to handle. FIG. 11 illustrates the image of fibers obtained at various temperatures, with decreasing fiber diameter being obtained with increasing bath temperature.

Example 9—GO Wet Spinning Conduit Size

Figure 14:
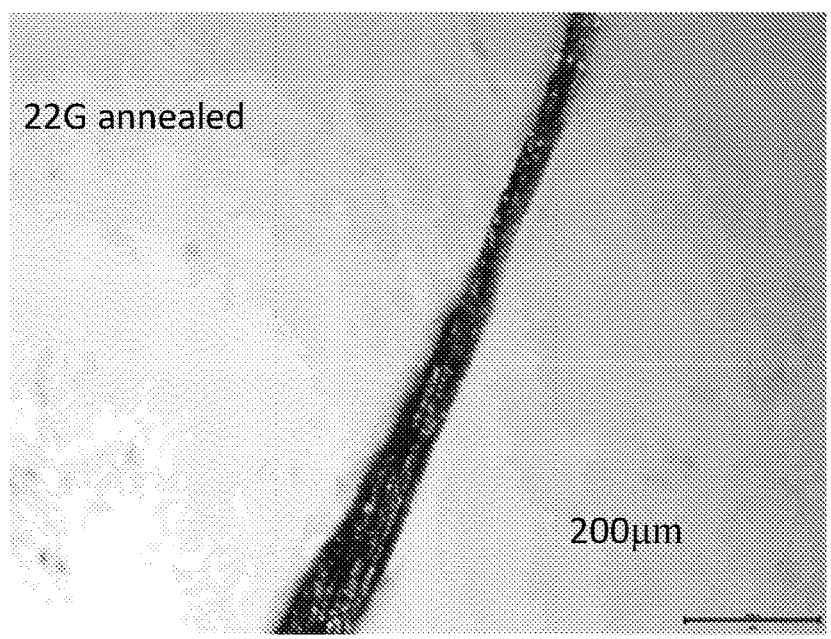
FIG. 14 illustrates an image of an exemplary annealed graphenic fiber provided herein produced using a larger nozzle conduit.
Figure 15:
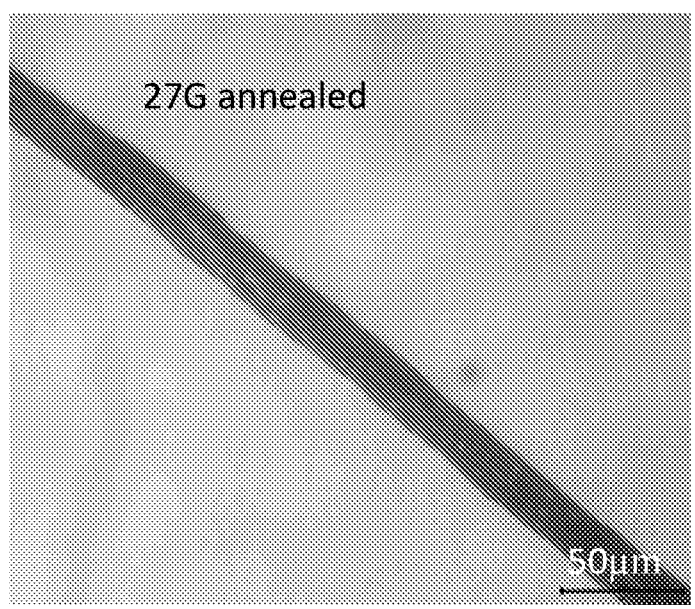
FIG. 15 illustrates an image of an exemplary annealed graphenic fiber provided herein produced using a smaller nozzle conduit.

Using a process similar to that in Example 7, multi-layered, large GO stocks are spun into an aqueous bath comprising ionic surfactant. The spinning nozzle is varied, using a 22 gauge needle (~0.413 mm) and a 27 gauge needle (~0.21 mm). The fibers are collected, (room temperature) dried, and thermally treated (annealed). The larger needle (22 G) produced larger nanofibers following both drying and thermal treatment, with the dried fibers having a size of about 70 micron to about 105 micron and the annealed fibers having a size of about 40 micron to about 90 micron. FIG. 14 illustrates an image of an exemplary fiber produced from the larger nozzle (22 G). The smaller needle (27 G) produced smaller nanofibers following both drying and thermal treatment, with the dried fibers having a diameter of about 30 micron and the annealed fibers having a size of about 20 micron. FIG. 15 illustrates an image of an exemplary fiber produced from the smaller nozzle conduit (27 G). Use of the smaller nozzle conduit produced fibers with a much more consistent and uniform fibers (e.g., size) along the length of the fiber both after drying and after annealing, as can be observed in the images of FIG. 14 and FIG. 15.

What is claimed is:

1. A process for manufacturing a graphenic yarn, the process comprising:
   providing a fluid stock, the fluid stock comprising a graphenic component and a first liquid medium;
   electrostatically charging the fluid stock;
   injecting the fluid stock into one or more second fluid medium, wherein the second fluid medium is a coagulation bath and the second fluid medium
   flows in a direction away from the spinning nozzle; and,
   bundling a plurality of fibers into a yarn.

2. The process of claim 1, wherein the graphenic yarn comprises an aligned bundle of a plurality of fibers comprising one or more graphenic components and each fiber having a belt-like or a cylindrical structure, wherein the one or more graphenic components, having an average length and an average width with a first aspect ratio of length/width, are configured to roll or fold, and fuse to form a second aspect ratio of at least 100 within a fiber construct, wherein the second aspect ratio is at least 5 times of the first aspect ratio; and wherein the plurality of aligned bundle of fibers are substantially uniform in size and substantially continuous along the length of the fiber or yarn.

3. The process of claim 1, wherein the fluid stock comprises a polymer.

4. The process of claim 1, further comprising collecting a fiber web comprising the plurality of fibers on or in proximity to a collector prior to bundling the plurality of fibers into a yarn.

5. The process of claim 1, wherein the second medium flows in a direction away from the nozzle such that the fibers are aligned and non-twisted in the bundle.

6. The process of claim 1, further comprising thermally treating the plurality of fibers and/or yarn.

7. The process of claim 1, further comprising removing or reducing non-graphenic components of the plurality of fibers or yarn.

* * * * *